(12) United States Patent
Ichimura

(10) Patent No.: US 12,003,886 B2
(45) Date of Patent: Jun. 4, 2024

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Gen Ichimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 354 days.

(21) Appl. No.: 17/309,721

(22) PCT Filed: Dec. 18, 2019

(86) PCT No.: PCT/JP2019/049718
§ 371 (c)(1),
(2) Date: Jun. 16, 2021

(87) PCT Pub. No.: WO2020/137767
PCT Pub. Date: Jul. 2, 2020

(65) Prior Publication Data
US 2022/0038656 A1 Feb. 3, 2022

(30) Foreign Application Priority Data
Dec. 26, 2018 (JP) ................................ 2018-242454

(51) Int. Cl.
*G10L 19/008* (2013.01)
*H04N 7/08* (2006.01)

(52) U.S. Cl.
CPC ............ *H04N 7/08* (2013.01); *G10L 19/008* (2013.01)

(58) Field of Classification Search
None
See application file for complete search history.

(56) References Cited

U.S. PATENT DOCUMENTS

| 6,115,482 A * | 9/2000 | Sears | G09B 21/001 |
| | | | 382/173 |
| 2003/0128182 A1* | 7/2003 | Donath | G01C 21/26 |
| | | | 345/156 |

(Continued)

FOREIGN PATENT DOCUMENTS

| BR | 112018000796 A2 | 9/2018 |
| CA | 2606238 A1 | 11/2006 |

(Continued)

OTHER PUBLICATIONS

International Search Report and Written Opinion of PCT Application No. PCT/JP2019/049718, issued on Mar. 17, 2020, 09 pages of ISRWO.

(Continued)

*Primary Examiner* — Jakieda R Jackson
(74) *Attorney, Agent, or Firm* — CHIP LAW GROUP

(57) ABSTRACT

A tactile vibration signals is satisfactorily transmitted. A transmission signal for each block including a plurality of frames for an audio signal is sequentially transmitted to a receiving side via a predetermined transmission line. The transmission signal includes a tactile vibration signal of a predetermined number of channels. For example, the tactile vibration signal is generated on the basis of a media signal associated with the audio signal. For example, configuration information of the tactile vibration signal of the predetermined number of channels is added to the transmission signal. For example, the configuration information is added by use of a predetermined bit area of a channel status configured for each block.

14 Claims, 25 Drawing Sheets

(56) References Cited

U.S. PATENT DOCUMENTS

| | | | |
|---|---|---|---|
| 2005/0254281 A1* | 11/2005 | Sawabe | G11B 20/00992 |
| 2006/0049966 A1* | 3/2006 | Ozawa | H04L 1/0045 |
| | | | 704/E19.003 |
| 2006/0256972 A1 | 11/2006 | Roy et al. | |
| 2007/0165675 A1* | 7/2007 | Yoneda | G06F 7/768 |
| | | | 370/476 |
| 2009/0222260 A1* | 9/2009 | Petr | G10L 25/90 |
| | | | 704/207 |
| 2010/0118927 A1* | 5/2010 | Ichimura | H04L 5/1423 |
| | | | 370/464 |
| 2010/0332004 A1 | 12/2010 | Paillard | |
| 2011/0129093 A1* | 6/2011 | Karam | G09B 21/04 |
| | | | 381/18 |
| 2012/0099012 A1* | 4/2012 | Ryu | H04N 23/661 |
| | | | 348/E5.022 |
| 2013/0227410 A1* | 8/2013 | Sridhara | H04N 21/43615 |
| | | | 715/702 |
| 2013/0243208 A1* | 9/2013 | Fawer | A61B 5/162 |
| | | | 381/57 |
| 2014/0100839 A1* | 4/2014 | Arendash | G06F 30/20 |
| | | | 381/98 |
| 2015/0130707 A1 | 5/2015 | Da Costa et al. | |
| 2015/0154966 A1 | 6/2015 | Bharitkar et al. | |
| 2015/0373472 A1 | 12/2015 | Kitani et al. | |
| 2015/0379899 A1* | 12/2015 | Baker | G09B 23/285 |
| | | | 434/262 |
| 2016/0026251 A1 | 1/2016 | Da Costa et al. | |
| 2016/0234588 A1* | 8/2016 | Timothy | H04R 1/1041 |
| 2017/0034612 A1* | 2/2017 | Timothy | H04R 9/063 |
| 2018/0074589 A1 | 3/2018 | Da Costa et al. | |
| 2018/0181368 A1* | 6/2018 | Trestain | G06F 3/165 |
| 2018/0200619 A1 | 7/2018 | Guillotel et al. | |
| 2018/0364898 A1* | 12/2018 | Chen | G06F 3/0483 |
| 2019/0005968 A1 | 1/2019 | Ichimura | |
| 2019/0278375 A1 | 9/2019 | Da Costa et al. | |
| 2021/0297627 A1 | 9/2021 | Ichimura | |

FOREIGN PATENT DOCUMENTS

| | | | |
|---|---|---|---|
| CA | 2712817 A1 | 8/2009 | |
| CA | 2992128 A1 | 1/2017 | |
| CN | 101204015 A | 6/2008 | |
| CN | 101971613 A | 2/2011 | |
| CN | 104623897 A | 5/2015 | |
| CN | 107519642 A | 12/2017 | |
| CN | 107835971 A | 3/2018 | |
| CN | 112585982 A | 3/2021 | |
| EP | 1875614 A1 | 1/2008 | |
| EP | 2873446 A1 | 5/2015 | |
| EP | 2881945 A1 | 6/2015 | |
| EP | 3118723 A1 | 1/2017 | |
| EP | 3323032 A1 | 5/2018 | |
| EP | 3421108 A2 | 1/2019 | |
| EP | 3833039 A1 | 6/2021 | |
| JP | 2008-539451 A | 11/2008 | |
| JP | 2011-520305 A | 7/2011 | |
| JP | 5986171 B2 | 9/2016 | |
| JP | 2018-055722 A | 4/2018 | |
| JP | 2018-060313 A | 4/2018 | |
| JP | 2018-527655 A | 9/2018 | |
| JP | 6552463 B2 | 7/2019 | |
| JP | 2019-185811 A | 10/2019 | |
| KR | 10-2010-0136964 A | 12/2010 | |
| KR | 10-2015-0056070 A | 5/2015 | |
| KR | 10-2017-0055464 A | 5/2017 | |
| KR | 10-2018-0030515 A | 3/2018 | |
| KR | 10-2019-0060737 A | 6/2019 | |
| KR | 10-2021-0049786 A | 5/2021 | |
| RU | 2018105082 A | 8/2019 | |
| TW | 202015375 A | 4/2020 | |
| WO | 2006/113999 A1 | 11/2006 | |
| WO | 2009/103162 A1 | 8/2009 | |
| WO | 2014/104007 A1 | 7/2014 | |
| WO | 2017/009181 A1 | 1/2017 | |
| WO | 2017/010358 A1 | 1/2017 | |
| WO | 2020/045044 A1 | 3/2020 | |

OTHER PUBLICATIONS

Extended European Search Report of EP Application No. 19906308. 2, dated Jan. 19, 2022, 07 pages.

\* cited by examiner

FIG. 2

|  | VIDEO SIGNAL | AUDIO SIGNAL | TACTILE VIBRATION SIGNAL |
|---|---|---|---|
| DYNAMIC RANGE | 48 – 96 dB | 96 – 144 dB | 40 – 60 dB |
| SAMPLING FREQUENCY | 60Hz - | 48kHz - | 2 kHz - |
| CONTINUATION/ DISCONTINUATION | DISCONTINUATION | CONTINUATION | CONTINUATION |
| DIMENSION | TWO DIMENSIONS/ THREE DIMENSIONS | ONE DIMENSION | ONE DIMENSION |

FIG. 5

HDMI PIN ARRANGEMENT (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG. 11

| PREAMBLE | CHANNEL CODING | | |
|---|---|---|---|
| | | | SUBFRAME #1, START OF BLOCK |
| "B" | 11101000 | 00010111 | |
| | | | SUBFRAME #1 |
| "M" | 11100010 | 00011101 | |
| | | | SUBFRAME #2 |
| "W" | 11100100 | 00011011 | |
| | 0 | 1 | |
| | (IMMEDIATELY PRECEDING STATE) | | |

FIG. 13

|   | 0 | 1 | 2 | 3 | 4 | 5 | 6 | 7 |
|---|---|---|---|---|---|---|---|---|
| 0 | 0<br>a="0" | 1<br>b="0" | 2<br>c | 3<br>d="001" : Multichannel LPCM | 4 | 5 | 6<br>Mode="00" | 7 |
| 1 | | | | | | | | |
| 2 | | | | | | | | |
| 3 | | | | | | | | |
| 4 | | | | | | | | |
| 5 | | | | | 44 | 45<br>Multichannel Count | 46 | 47 |
| 6 | | | | | | 53 | 54<br>Multichannel configuration value | 55 |
| 7 | 56<br>Multichannel configuration value | 57 | 58 | 59 | 60 | | | |
| 8 | 64<br>Multichannel<br>map bit 65 to 191;<br>0: no info<br>1: Activated | 65<br>FL | 66<br>FR | 67<br>FC | 68<br>LFE | 69<br>LS | 70<br>RS | 71<br>FLc |
| 9 | 72<br>FLc | 73<br>BC | 74<br>LFE1 | 75<br>SiL | 76<br>SiR | 77<br>HFL | 78<br>HFR | 79<br>HFC |
| 10 | 80<br>Ohc | 81<br>HLS | 82<br>HRS | 83<br>HSiL | 84<br>HSiR | 85<br>HBC | 86<br>BtFC | 87<br>BtFLmid |
| 11 | 88<br>BtFRmid | 89<br>FLw | 90<br>FRw | 91<br>BL | 92<br>BR | 93<br>LBS | 94<br>RBS | 95<br>HBL |
| 12 | 96<br>HBR | 97<br>HFLw | 98<br>HFRw | 99<br>OhFL | 100<br>OhFR | 101<br>OhSiL | 102<br>OHsiR | 103<br>OhBL |
| 13 | 104<br>OhBR | 105<br>HFLmid | 106<br>HFRmid | 107<br>HBLmid | 108<br>HBRmid | 109<br>FLmid | 110<br>FRmid | 111<br>BLmid |
| 14 | 112<br>BRmid | 113<br>LFE2 | 114<br>BLmidDiffus | 115<br>BRmidDiffus | 116<br>OhBC | 117 | 118 | 119 |
| 15 | 120<br>Left Hand | 121<br>Right Hand | 122<br>Legs | | | | | |
| ⋮ | | | | | | | | |
| 23 | 184<br>MS | 185<br>CS | 186<br>LSS | 187<br>RSS | 188<br>LRS | 189<br>RRS | 190<br>ISO/IEC<br>23001-8<br>CH1 | 191<br>ISO/IEC<br>23001-8<br>CH2 |

FIG. 14

| Multichannel Configuration value | Multichannel Order; Channel number and label are based on IEC 62574 ED2 | ISO/IEC 23001-8 2016: ChannelConfiguration |
|---|---|---|
| 10000000 | 67: FC | ChannelConfiguration 1 |
| 01000000 | 65: FL<br>66: FR | ChannelConfiguration 2 |
| 11000000 | 65: FL<br>66: FR<br>67: FC | ChannelConfiguration 3 |
| 10010000 | 65: FL<br>66: FR<br>73: FC | ChannelConfiguration 3 |
| 00100000 | 65: FL<br>66: FR<br>67: FC<br>184: MS | ChannelConfiguration 4 |
| 10100000 | 65: FL<br>66: FR<br>67: FC<br>69: LS<br>70: RS | ChannelConfiguration 5 |
| 01100000 | 65: FL<br>66: FR<br>67: FC<br>68: LFE<br>69: LS<br>70: RS | ChannelConfiguration 6 |
| 11100000 | 65: FL<br>66: FR<br>67: FC<br>68: LFE<br>69: LS<br>70: RS<br>109: FLmid<br>110: FRmid | ChannelConfiguration 7 |

FIG. 15

| | | CRC | | |
|---|---|---|---|---|
| 1 (Start) | 0 | | | |
| 1 (Start) | 0 | CRC | 62574 ID | |
| 1 (Start) | 0 | 62574 ID: Speaker configurations | Overhead speaker | |
| 1 (Start) | 0 | Overhead speaker | High speakers | |
| 1 (Start) | 0 | High speakers | Middle speakers | |
| 1 (Start) | 0 | Middle speakers | Bottom speakers | |
| 1 (Start) | 0 | Bottom speakers | Subwoofer (LFE) | |
| 1 (Start) | 0 | Subwoofer (LFE) | Overhead speaker | |
| 1 (Start) | 0 | Overhead speaker | High speakers | |
| 1 (Start) | 0 | High speakers | | |
| | 0 | 0 | 0 | 0 |
| 1 (Start) | 0 | 0 | 0 | 0 |
| | 0 | 0 | 0 | 0 |

FIG. 16

| 1 (Start) | Q | CRC | | |
|---|---|---|---|---|
| 1 (Start) | Q | CRC | 62574 ID | |
| 1 (Start) | Q | 62574 ID | Multichannel order #1 | |
| 1 (Start) | Q | Multichannel order #1 | | |
| 1 (Start) | Q | Multichannel Number #1 | | |
| 1 (Start) | Q | Multichannel Number #1 | Multichannel order #2 | |
| 1 (Start) | Q | Multichannel order #2 | Multichannel Number #2 | |
| 1 (Start) | | Multichannel Number #2 | | |
| 1 (Start) | Q | 0 | 0 | 0 |
| 1 (Start) | Q | 0 | 0 | 0 |

FIG. 17

| IEC 60958-1 preamble | IEC 60958-1 channel | Multichannel order | Multichannel subgroup 1 Multichannel Configuration C-Bit 53 to 60 | Multichannel subgroup 2 Multichannel Map C-Bit 64-191 | Multichannel subgroup 3 & 4 U-Bit |
|---|---|---|---|---|---|
| B | 1 | 1 | 11000000 | | |
| W | 2 | 2 | 65: FL | | |
| M | 1 | 3 | 66: FR | | |
|   |   |   | 67: FC | | |
| W | 2 | 4 | | | |
| M | 1 | 5 | | 77: HFL | |
| W | 2 | 6 | | 78: HFR | |
| M | 1 | 7 | | | 80: OhC(1,0,0,0,0) |
| W | 2 | 8 | | | 65: FL(0,0,2,0,0) |
|   |   |   | | | 66: FR(0,0,2,0,0) |
| M | 1 | 1 | 11000000 | | |
| W | 2 | 2 | 65: FL | | |
| M | 1 | 3 | 66: FR | | |
|   |   |   | 67: FC | | |
| W | 2 | 4 | | | |
| M | 1 | 5 | | 77: HFL | |
| W | 2 | 6 | | 78: HFR | |
| M | 1 | 7 | | | 80: OhC(1,0,0,0,0) |
| W | 2 | 8 | | | 65: FL(0,0,2,0,0) |
|   |   |   | | | 66: FR(0,0,2,0,0) |
| ... | ... | ... | ... | ... | ... |

FIG. 19

| MULTI-CHANNEL TRANSMISSION ORDER | CHANNEL NAME | CHANNEL NUMBER |
|---|---|---|
| 1 | Front Left | 65 |
| 2 | Front Right | 66 |
| 3 | Front Center | 67 |
| 4 | LFE | 68 |
| 5 | Left Surround | 69 |
| 6 | Right Surround | 70 |
| 7 | Left Hand (VIBRATION SIGNAL FOR RIGHT ARM) | 120 |
| 8 | Right Hand (VIBRATION SIGNAL FOR LEFT ARM) | 121 |

FIG. 20

| IEC 60958-1 preamble | IEC 60958-1 channel | Multichannel order | Multichannel subgroup 1 — Multichannel Map C-Bit 64-191 |
|---|---|---|---|
| B | 1 | 1 | 65:FL |
| W | 2 | 2 | 66:FR |
| B | 1 | 3 | 67:FC |
| W | 2 | 4 | 68:LFE |
| M | 1 | 5 | 69:LS |
| W | 2 | 6 | 70:RS |
| M | 1 | 7 | 120:Left Hand |
| W | 2 | 8 | 121:Right Hand |
| M | 1 | 1 | 65:FL |
| W | 2 | 2 | 66:FR |
| M | 1 | 3 | 67:FC |
| W | 2 | 4 | 68:LFE |
| M | 1 | 5 | 69:LS |
| W | 2 | 6 | 70:RS |
| M | 1 | 7 | 120:Left Hand |
| W | 2 | 8 | 121:Right Hand |
| ⋮ | ⋮ | ⋮ | ⋮ |

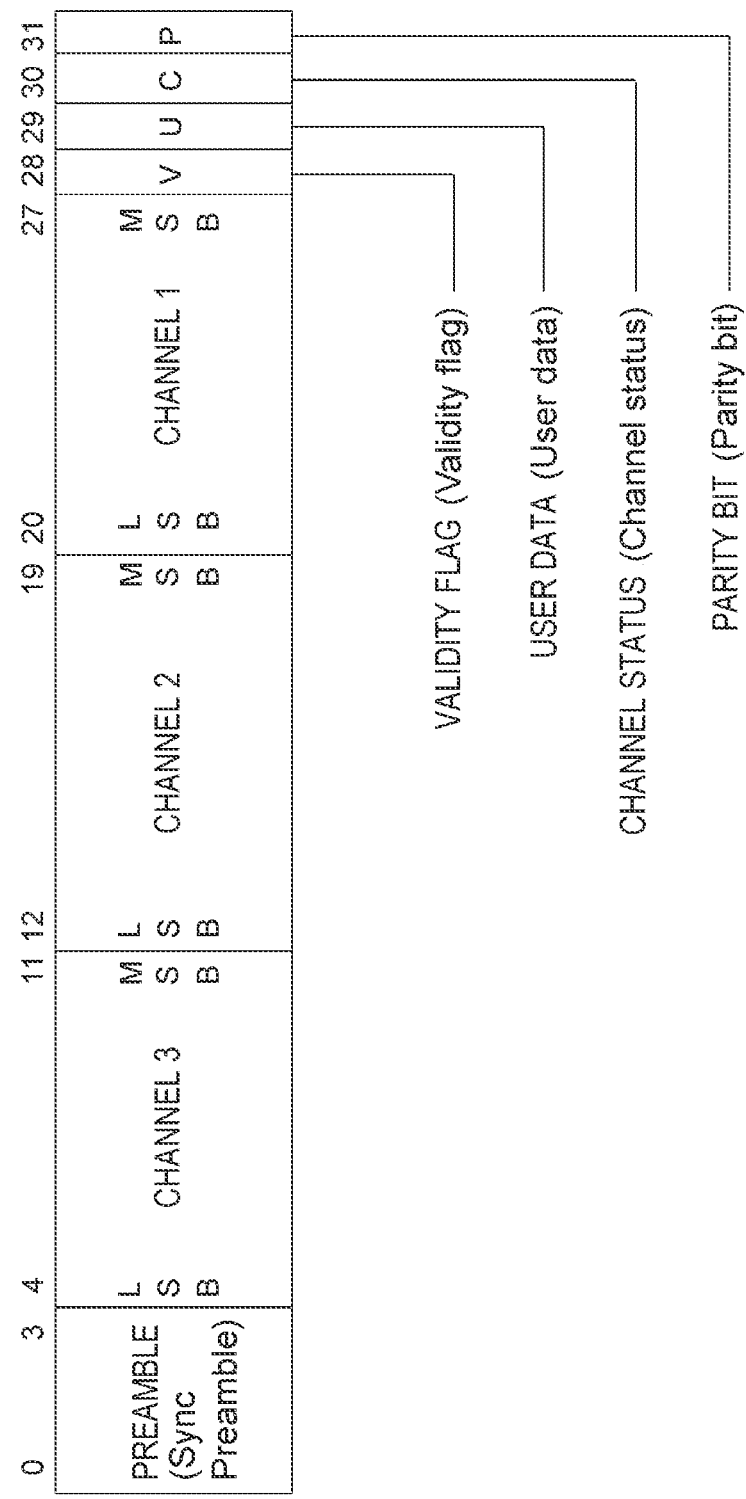

FIG. 23

| TRANSMISSION FREQUENCY | LPCM FORMAT | MULTI-TACTILE SIGNAL FORMAT | | |
|---|---|---|---|---|
| 128 × 48 kHz | 48kHz 2ch 24bit | 3kHz 32ch 24bit | 3kHz 96ch 8bit | 3kHz 64ch 12bit |
| 128 × 96 kHz | 96kHz 2ch 24bit | 3kHz 64ch 24bit | 3kHz 192ch 8bit | 3kHz 128ch 12bit |
| 128 × 192 kHz | 192kHz 2ch 24bit | 3kHz 128ch 24bit | 3kHz 384ch 8bit | 3kHz 256ch 12bit |
| 128 × 48 kHz | 48kHz 2ch 24bit | 6kHz 16ch 24bit | 6kHz 48ch 8bit | 6kHz 32ch 12bit |
| 128 × 96 kHz | 96kHz 2ch 24bit | 6kHz 32ch 24bit | 6kHz 96ch 8bit | 6kHz 64ch 12bit |
| 128 × 192 kHz | 192kHz 2ch 24bit | 6kHz 64ch 24bit | 6kHz 192ch 8bit | 6kHz 128ch 12bit |
| 128 × 384 kHz | 384kHz 2ch 24bit | 6kHz 128ch 24bit | 6kHz 384ch 8bit | 6kHz 256ch 12bit |
| 128 × 768 kHz | 768kHz 2ch 24bit | 6kHz 256ch 24bit | 6kHz 768ch 8bit | 6kHz 512ch 12bit |

FIG. 24

|   | 0 | 1 | 2 | 3 | 4 | 5 | 6 | 7 |
|---|---|---|---|---|---|---|---|---|
| 0 | 0<br>a="0" | 1<br>b="0" | 2<br>c | 3<br>d="001" : Mult | 4<br>ichannel LPCM | 5 | 6<br>Mode | 7<br>="00" |
| 1 |   |   |   |   |   |   |   |   |
| 2 |   |   |   |   |   |   |   |   |
| 3 | 24 | 25<br>Sampling | 26<br>frequency | 27 |   |   | 30<br>Sampling fre | 31<br>quency extension |
| 4 |   |   |   |   |   |   |   |   |
| 5 |   |   |   |   |   |   |   |   |
| 6 |   | 49<br>Multichann | 50<br>el configurat | 51<br>ion type | 52 | 53<br>Multichannel | 54<br>configuratio | 55<br>n value |
| 7 | 56 | 57<br>Multi | 58<br>channel conf | 59<br>iguration value | 60 |   |   |   |
| ⋮ |   |   |   |   |   |   |   |   |
| 23 |   |   |   |   |   |   |   |   |

FIG. 25

| Multichannel configuration value | Haptic mode |
|---|---|
| 10000000 | 3kHz 24bit MODE (WITHOUT VIBRATION POINT INFORMATION) |
| 01000000 | 3kHz 12bit MODE (WITHOUT VIBRATION POINT INFORMATION) |
| 11000000 | 3kHz 8bit MODE (WITHOUT VIBRATION POINT INFORMATION) |
| 00100000 | 6kHz 24bit MODE (WITHOUT VIBRATION POINT INFORMATION) |
| 10100000 | 6kHz 12bit MODE (WITHOUT VIBRATION POINT INFORMATION) |
| 01100000 | 6kHz 8bit MODE (WITHOUT VIBRATION POINT INFORMATION) |

FIG. 26

| Multichannel configuration value | Haptic mode |
|---|---|
| 10000001 | 3kHz 24bit MODE (WITH VIBRATION POINT INFORMATION) |
| 01000001 | 3kHz 12bit MODE (WITH VIBRATION POINT INFORMATION) |
| 11000001 | 3kHz 8bit MODE (WITH VIBRATION POINT INFORMATION) |
| 00100001 | 6kHz 24bit MODE (WITH VIBRATION POINT INFORMATION) |
| 10100001 | 6kHz 12bit MODE (WITH VIBRATION POINT INFORMATION) |
| 01100001 | 6kHz 8bit MODE (WITH VIBRATION POINT INFORMATION) |

FIG. 27

| CHANNEL ORDER | | CHANNEL ORDER | |
|---|---|---|---|
| 1 | RIGHT THUMB | 17 | RIGHT SHOULDER |
| 2 | RIGHT INDEX FINGER | 18 | MIDDLE PART BETWEEN RIGHT SHOULDER AND ELBOW |
| 3 | RIGHT MIDDLE FINGER | 19 | RIGHT ELBOW |
| 4 | RIGHT RING FINGER | 20 | MIDDLE PART BETWEEN RIGHT ELBOW AND WRIST |
| 5 | RIGHT LITTLE FINGER | 21 | LEFT SHOULDER |
| 6 | BACK OF RIGHT HAND | 22 | MIDDLE PART BETWEEN LEFT SHOULDER AND ELBOW |
| 7 | RIGHT PALM | 23 | LEFT ELBOW |
| 8 | RIGHT WRIST | 24 | MIDDLE PART BETWEEN LEFT ELBOW AND WRIST |
| 9 | LEFT THUMB | 25 | RIGHT BELLY |
| 10 | LEFT INDEX FINGER | 26 | RIGHT FEMUR |
| 11 | LEFT MIDDLE FINGER | 27 | RIGHT CRUS |
| 12 | LEFT RING FINGER | 28 | RIGHT SOLE |
| 13 | LEFT LITTLE FINGER | 29 | LEFT BELLY |
| 14 | BACK OF LEFT HAND | 30 | LEFT FEMUR |
| 15 | LEFT PALM | 31 | LEFT CRUS |
| 16 | LEFT WRIST | 32 | LEFT SOLE |

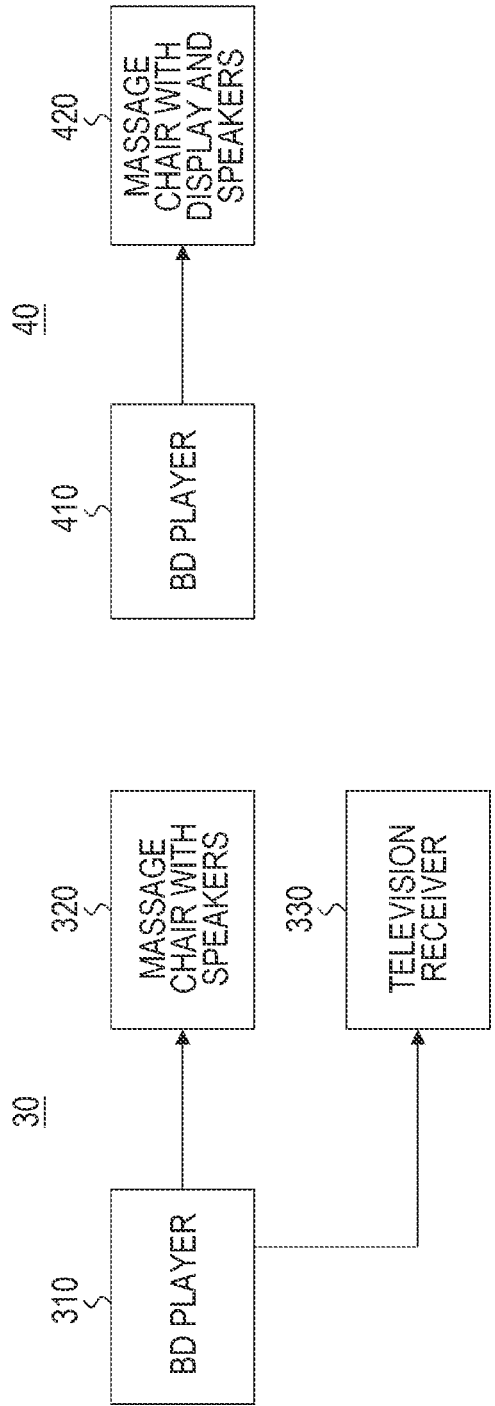

TRANSMISSION DEVICE, TRANSMISSION METHOD, RECEPTION DEVICE, AND RECEPTION METHOD

CROSS REFERENCE TO RELATED APPLICATIONS

This application is a U.S. National Phase of International Patent Application No. PCT/JP2019/049718 filed on Dec. 18, 2019, which claims priority benefit of Japanese Patent Application No. JP 2018-242454 filed in the Japan Patent Office on Dec. 26, 2018. Each of the above-referenced applications is hereby incorporated herein by reference in its entirety.

TECHNICAL FIELD

The present technology relates to a transmission device, a transmission method, a reception device, and a reception method, and more particularly to a transmission device, a transmission method, a reception device, and a reception method that handle tactile vibration signals.

BACKGROUND ART

Multi-channel audio applications such as a 5.1-channel audio application and a 7.1-channel audio application are operated by naming channels to identify the usage of each channel. The channels are, for example, a right channel, a left channel, a center channel, a low frequency effect (LFE) channel, and the like. These are expected to be delivered to loudspeakers arranged at positions indicated by their names and reproduced as sound.

In recent years, multimedia applications have been proposed, including a tactile vibration application or the like used in synchronization with audio-video. For example, Patent Document 1 describes a technology for transmitting tactile vibration signals (tactile signals) and vibrating a vibrating portion on the basis of the tactile vibration signals on a receiving side.

CITATION LIST

Patent Document

Patent Document 1: Japanese Patent Application Laid-Open No. 2018-060313

SUMMARY OF THE INVENTION

Problems to be Solved by the Invention

In the tactile vibration application used in synchronization with audio-video, it is desired to transmit the tactile vibration signals in synchronization with audio signals. Furthermore, there are also an application that does not require the audio signals and an application that wants to transmit many tactile vibration signal channels.

A purpose of the present technology is to satisfactorily transmit tactile vibration signals.

Solutions to Problems

A concept of the present technology lies in
a transmission device including
a transmission unit that sequentially transmits a transmission signal for each block including a plurality of frames for an audio signal to a receiving side via a predetermined transmission line, in which
the transmission signal includes a tactile vibration signal of a predetermined number of channels.

In the present technology, the transmission unit sequentially transmits the transmission signal for each block including the plurality of frames for the audio signal to the receiving side via the predetermined transmission line. Here, the transmission signal includes the tactile vibration signal of the predetermined number of channels. For example, the predetermined transmission line may include a coaxial cable, an optical cable, an Ethernet (IEC61883-6) cable, an HDMI cable, an MHL cable, or a display port cable.

For example, an information addition unit that adds, to the transmission signal, configuration information of the tactile vibration signal of the predetermined number of channels may further be included. In this case, for example, the configuration information may include information regarding a sampling frequency of the tactile vibration signal, information regarding a bit depth of the tactile vibration signal, information regarding the predetermined number of channels, or information indicating the presence or absence of vibration point information. For example, the configuration information may be added by use of a predetermined bit area of a channel status configured for each block.

As described above, in the present technology, the transmission signal for each block including the plurality of frames for the audio signal is sequentially transmitted to the receiving side via the predetermined transmission line, and the transmission signal includes the tactile vibration signal of the predetermined number of channels. Therefore, the tactile vibration signal of the predetermined number of channels can be satisfactorily transmitted by use of the transmission signal for the audio signal.

Furthermore, another concept of the present technology lies in
a reception device including
a reception unit that sequentially receives a transmission signal for each block including a plurality of frames for an audio signal from a transmitting side via a predetermined transmission line, in which
the transmission signal includes a tactile vibration signal of a predetermined number of channels.

In the present technology, the reception unit sequentially receives the transmission signal for each block including the plurality of frames for the audio signal from the transmitting side via the predetermined transmission line. Here, the transmission signal includes the tactile vibration signal of the predetermined number of channels. For example, the predetermined transmission line may include a coaxial cable, an optical cable, an Ethernet (IEC 61883-6) cable, an HDMI cable, an MHL cable, or a display port cable.

For example, a processing unit that processes the transmission signal and outputs the tactile vibration signal of the predetermined number of channels may further be included. In addition, in this case, for example, the transmission signal may include configuration information of the tactile vibration signal of the predetermined number of channels, and the processing unit may process the signal on the basis of the configuration information and output the tactile vibration signal of the predetermined number of channels. Furthermore, for example, the configuration information may be added by use of a predetermined bit area of a channel status configured for each block.

As described above, in the present technology, the transmission signal for each block including the plurality of frames for the audio signal is sequentially received from the transmitting side via the predetermined transmission line, and the transmission signal includes the tactile vibration signal of the predetermined number of channels. Therefore, the tactile vibration signal of the predetermined number of channels can be satisfactorily received by use of the transmission signal for the audio signal.

BRIEF DESCRIPTION OF DRAWINGS

FIG. 2 is a diagram illustrating, by comparison, an example of dynamic ranges, sampling frequencies, continuation/discontinuation, and dimensions of a video signal, an audio signal, and a tactile vibration signal.

FIG. 5 is a diagram illustrating a pin arrangement of an HDMI connector.

FIG. 11 is a diagram illustrating channel coding of preambles in the IEC 60958 standard.

FIG. 13 is a diagram schematically illustrating a format of a channel status in the IEC 60958 standard.

FIG. 14 is a diagram illustrating a correspondence relationship between values of a multi-channel configuration and audio channel sets indicated by the values.

FIG. 15 is a diagram illustrating an example of a packet that specifies the number of speakers for each height.

FIG. 16 is a diagram illustrating an example of a packet that designates what number of audio channel is transmitted with respect to a transmission order in a multi-channel group.

FIG. 17 is a diagram illustrating a specific example of a method of designating multi-channel groups 1 to 4 in the multi-channel transmission format.

FIG. 19 is a diagram illustrating transmission signals including 5.1-channel audio and 2-channel tactile vibration signals.

FIG. 20 is a diagram for describing an example in which a multi-channel subgroup for simultaneously transmitting the multi-channel audio signals and the tactile vibration signals of the predetermined number of channels is designated by a second method.

FIG. 22 is a diagram for describing that a 24-bit slot in a subframe is divided into three by 8 bits and 3-channel tactile vibration signals are assigned.

FIG. 23 is a diagram illustrating an example of correspondence between LPCM formats and multi-tactile signals.

FIG. 24 is a diagram schematically illustrating a format of a channel status in the IEC 60958 standard.

FIG. 25 is a diagram illustrating an example of a correspondence relationship between values of "Multichannel Configuration value" and tactile vibration signal modes.

FIG. 26 is a diagram illustrating another example of the correspondence relationship between values of "Multichannel Configuration value" and tactile vibration signal modes.

FIG. 27 is a diagram illustrating an example of 32-channel vibration points prescribed in advance.

FIGS. 28A and 28B are diagrams for describing another configuration example of the AV system to which the present technology can be applied.

MODE FOR CARRYING OUT THE INVENTION

Hereinafter, a mode for carrying out the invention (hereinafter, referred to as "embodiment") will be described. Note that the description will be made in the following order.
1. Embodiment
2. Modified Example

1. EMBODIMENT

[Configuration Example of AV System]

Figure 1:
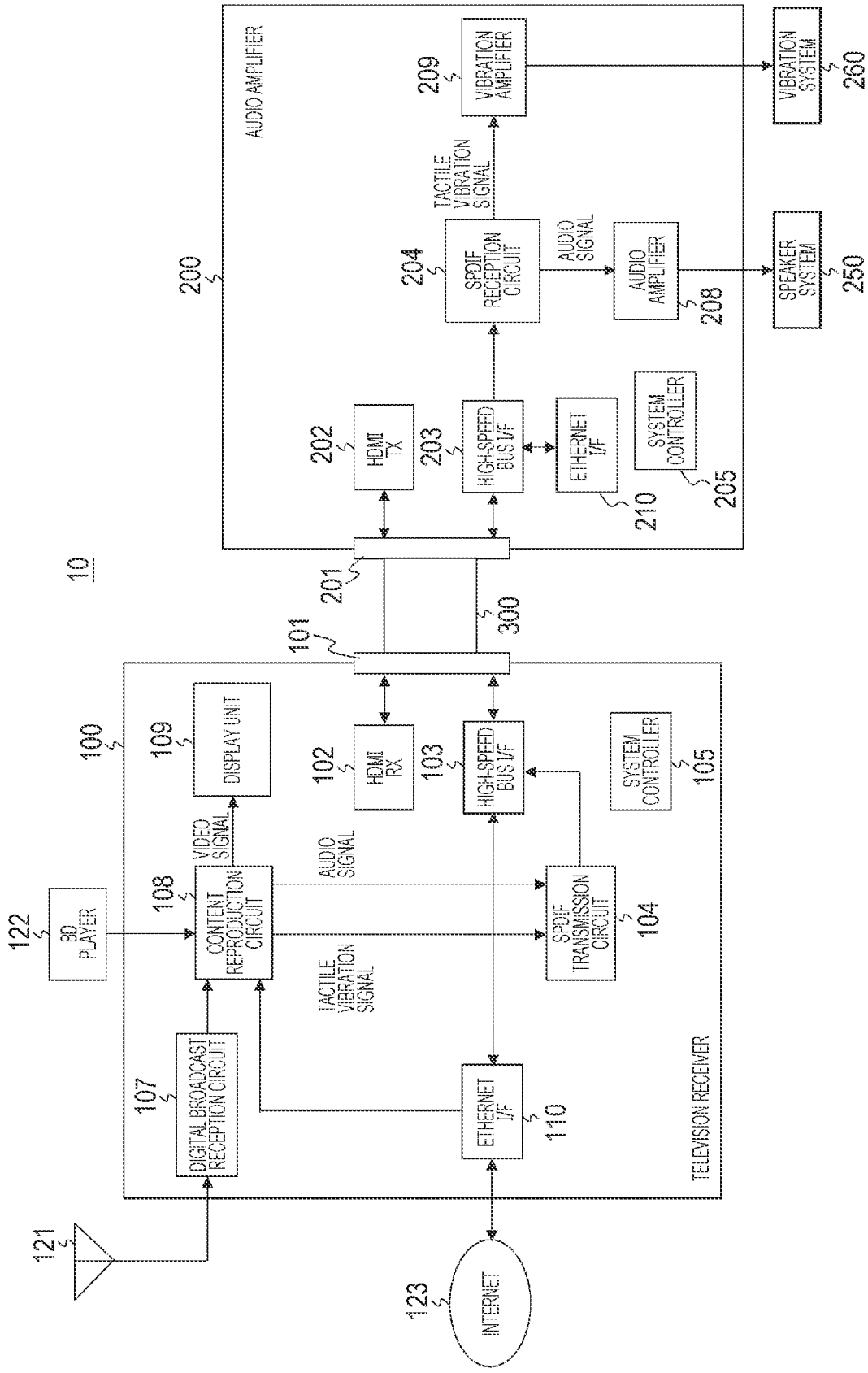
FIG. 1 is a block diagram illustrating a configuration example of an AV system as an embodiment.

FIG. 1 illustrates a configuration example of an audio/visual (AV) system 10 as an embodiment. The AV system 10 includes a television receiver 100 and an audio amplifier 200. A reception antenna 121 for television broadcast, a Blu-ray Disc (BD) player 122, and an Internet 123 are connected to the television receiver 100. Furthermore, a 2-channel or multi-channel speaker system 250 and a 1-channel or multi-channel vibration system 260 are connected to the audio amplifier 200. Note that "Blu-ray" is a registered trademark.

The television receiver 100 and the audio amplifier 200 are connected via an HDMI cable 300. Note that "HDMI" is a registered trademark. The television receiver 100 is provided with an HDMI terminal 101 to which an HDMI reception unit (HDMI RX) 102 and a high-speed bus interface 103 constituting a communication unit are connected. The audio amplifier 200 is provided with an HDMI terminal 201 to which an HDMI transmission unit (HDMI TX) 202 and a high-speed bus interface 203 constituting a communication unit are connected. One end of the HDMI cable 300 is connected to the HDMI terminal 101 of the television receiver 100, and the other end of the HDMI cable 300 is connected to the HDMI terminal 201 of the audio amplifier 200.

The television receiver 100 includes the HDMI reception unit 102, the high-speed bus interface 103, and an SPDIF transmission circuit 104. Furthermore, the television receiver 100 includes a system controller 105, a digital broadcast reception circuit 107, a content reproduction circuit 108, a display unit 109, and an Ethernet interface 110. Note that "Ethernet" and "Ethernet" are registered trademarks. Furthermore, in the illustrated example, each part of the image system is appropriately omitted for simplification of the description.

The system controller 105 controls the operation of each part of the television receiver 100. The digital broadcast reception circuit 107 processes television broadcast signals input from the reception antenna 121 to output first mode signals (video signals, multi-channel audio signals (linear PCM signals), and tactile vibration signals of a predetermined number of channels) or second mode signals (tactile vibration signals of a predetermined number of channels) related to broadcast content.

Here, the multi-channel audio signals include audio signals of a plurality of numbers of channels. Furthermore, the tactile vibration signals of the predetermined number of channels related to the first mode signals are for obtaining vibrations synchronized with video or audio. In addition, the tactile vibration signals of the predetermined number of channels related to the second mode signals are for obtaining, for example, vibrations for massage, healing, or the like, which are not directly related to video or audio.

The Ethernet interface 110 communicates with an external server via the Internet 123 to output first mode signals (video signals, multi-channel audio signals (linear PCM signals), and tactile vibration signals of a predetermined number of channels) or second mode signals (tactile vibration signals of a predetermined number of channels) related to net content.

Furthermore, the BD player 122 outputs, by a playback operation, first mode signals (video signals, multi-channel audio signals (linear PCM signals), and tactile vibration signals of a predetermined number of channels) or second mode signals (tactile vibration signals of a predetermined number of channels) related to reproduced content.

The content reproduction circuit 108 selectively takes out the first mode signals or the second mode signals obtained by the digital broadcast reception circuit 107, the Ethernet interface 110, or the BD player 122.

The content reproduction circuit 108 then sends the video signals to the display unit 109 in a case of taking out the first mode signals. The display unit 109 displays an image based on the video signals.

Furthermore, in the case of taking out the first mode signals, the content reproduction circuit 108 sends the multi-channel audio signals and the tactile vibration signals of the predetermined number of channels to the SPDIF transmission circuit 104. The SPDIF transmission circuit 104 simultaneously transmits the multi-channel audio signals (linear PCM signals) and the tactile vibration signals of the predetermined number of channels to the audio amplifier 200.

Furthermore, in a case of taking out the second mode signals, the content reproduction circuit 108 sends the tactile vibration signals of the predetermined number of channels to the SPDIF transmission circuit 104. The SPDIF transmission circuit 104 transmits the tactile vibration signals of the predetermined number of channels to the audio amplifier 200.

The SPDIF transmission circuit 104 is a circuit for transmitting digital audio transmission signals of the IEC 60958 standard (hereinafter, appropriately referred to as "SPDIF signals"). This SPDIF transmission circuit 104 is a transmission circuit conforming to the IEC 60958 standard. Note that the details of the SPDIF signals will be described later.

As described above, the SPDIF transmission circuit 104 transmits, to the audio amplifier 200, the multi-channel audio signals (linear PCM signals) and the tactile vibration signals of the predetermined number of channels in the case of handling the first mode signals, and transmits, to the audio amplifier 200, only the tactile vibration signals of the predetermined number of channels in the case of handling the second mode signals.

In this case, as the SPDIF signals, transmission signals for each block including a plurality of frames, here 192 frames, are sequentially transmitted. Furthermore, the transmission signals include the multi-channel audio signals and the tactile vibration signals of the predetermined number of channels related to the first mode signals or the tactile vibration signals of the predetermined number of channels related to the second mode signals.

To the transmission signals, configuration information of the multi-channel audio signals and the tactile vibration signals of the predetermined number of channels related to the first mode signals or the tactile vibration signals of the predetermined number of channels related to the second mode signals is added. For example, this configuration information is added by use of a predetermined bit area of a channel status configured for each block.

The HDMI reception unit 102 receives, by HDMI-compliant communication, video data and audio data supplied to the HDMI terminal 101 via the HDMI cable 300. The high-speed bus interface 103 is a bidirectional communication path interface configured by use of a reserve line and a hot plug detect (HPD) line constituting the HDMI cable 300. Note that the details of the HDMI reception unit 102 and the high-speed bus interface 103 will be described later.

The audio amplifier 200 includes the HDMI transmission unit 202, the high-speed bus interface 203, and an SPDIF reception circuit 204. Furthermore, the audio amplifier 200 includes a system controller 205, an audio amplifier 208, a vibration amplifier 209, and an Ethernet interface 210.

The system controller 205 controls the operation of each part of the audio amplifier 200. The HDMI transmission unit 202 transmits video data and audio data from the HDMI terminal 201 to the HDMI cable 300 by the HDMI-compliant communication. The high-speed bus interface 203 is a bidirectional communication path interface configured by use of a reserve line and a hot plug detect (HPD) line constituting the HDMI cable 300. Note that the details of the HDMI transmission unit 202 and the high-speed bus interface 203 will be described later.

The SPDIF reception circuit 204 receives the transmission signals as the SDPIF signals (digital audio signals of the IEC 60958 standard), and acquires the multi-channel audio signals and the tactile vibration signals of the predetermined number of channels related to the first mode signals or the tactile vibration signals of the predetermined number of channels related to the second mode signals included in the transmission signals. In this case, the SPDIF reception circuit 204 takes out the multi-channel audio signals and the tactile vibration signals of the predetermined number of channels related to the first mode signals or the tactile vibration signals of the predetermined number of channels related to the second mode signals on the basis of configuration information included in the transmission signals.

The audio amplifier 208 amplifies, for each channel, the multi-channel audio signals related to the first mode signals taken out by the SPDIF reception circuit 204, and sends the multi-channel audio signals to the speaker system 250 including speakers corresponding to the channels. With this configuration, the speaker system 250 performs audio reproduction based on the multi-channel audio signals.

Furthermore, the vibration amplifier 209 amplifies, for each channel, the tactile vibration signals of the predetermined number of channels related to the first mode signals or the tactile vibration signals of the predetermined number of channels related to the second mode signals taken out by the SPDIF reception circuit 204, and sends the tactile vibration signals to the vibration system 260 including vibration devices corresponding to the channels. With this configuration, the vibration system 260 performs vibration reproduction based on the tactile vibration signals of the predetermined number of channels.

In this case, as described above, in the case of handling the first mode signals, since the tactile vibration signals of the predetermined number of channels are sent simultaneously with the multi-channel audio signals, this vibration reproduction is correctly synchronized with the audio reproduction, and is also synchronized with the video display on the display unit 109 of the television receiver 100. Furthermore, in the case of handling the second mode signals, since only the tactile vibration signals of the predetermined number of channels are sent, the audio reproduction is not performed, and, for example, only the vibration reproduction for massage, healing, or the like is performed.

FIG. 2 illustrates, by comparison, an example of dynamic ranges, sampling frequencies, continuation/discontinuation, and dimensions of the video signal, the audio signal, and the tactile vibration signal. The video signal is a signal whose dynamic range is 48-96 dB, whose sampling frequency is 60 Hz, and that is discontinuous and two-dimensional or three dimensional. Furthermore, the audio signal is a signal whose dynamic range is 96 dB-144 dB, whose sampling frequency is 48 kHz, and that is continuous and one-dimensional.

Moreover, the tactile vibration signal is a signal whose dynamic range is 40-60 dB, whose sampling frequency is 2 kHz, and that is continuous and one-dimensional. As described above, the tactile vibration signal is a continuous signal having a high sampling frequency, similarly to the audio signal. Therefore, as described above, the tactile vibration signal is transmitted by use of a transmission line for the audio signal, so that it is possible to easily and readily transmit the tactile vibration signal.

Note that, as described above, the tactile vibration signals is said to have a dynamic range of 40-60 dB and a frequency band of DC-1 kHz, and is closer to the audio signal than the video signal. A digital audio interface that can transmit linear PCM can also transmit the tactile vibration signal. In this case, regarding a DC region, it is possible to express "push" with a plus and "pull" or "draw" with a minus.

"Configuration Example of HDMI Transmission Unit/Reception Unit"

Figure 3:
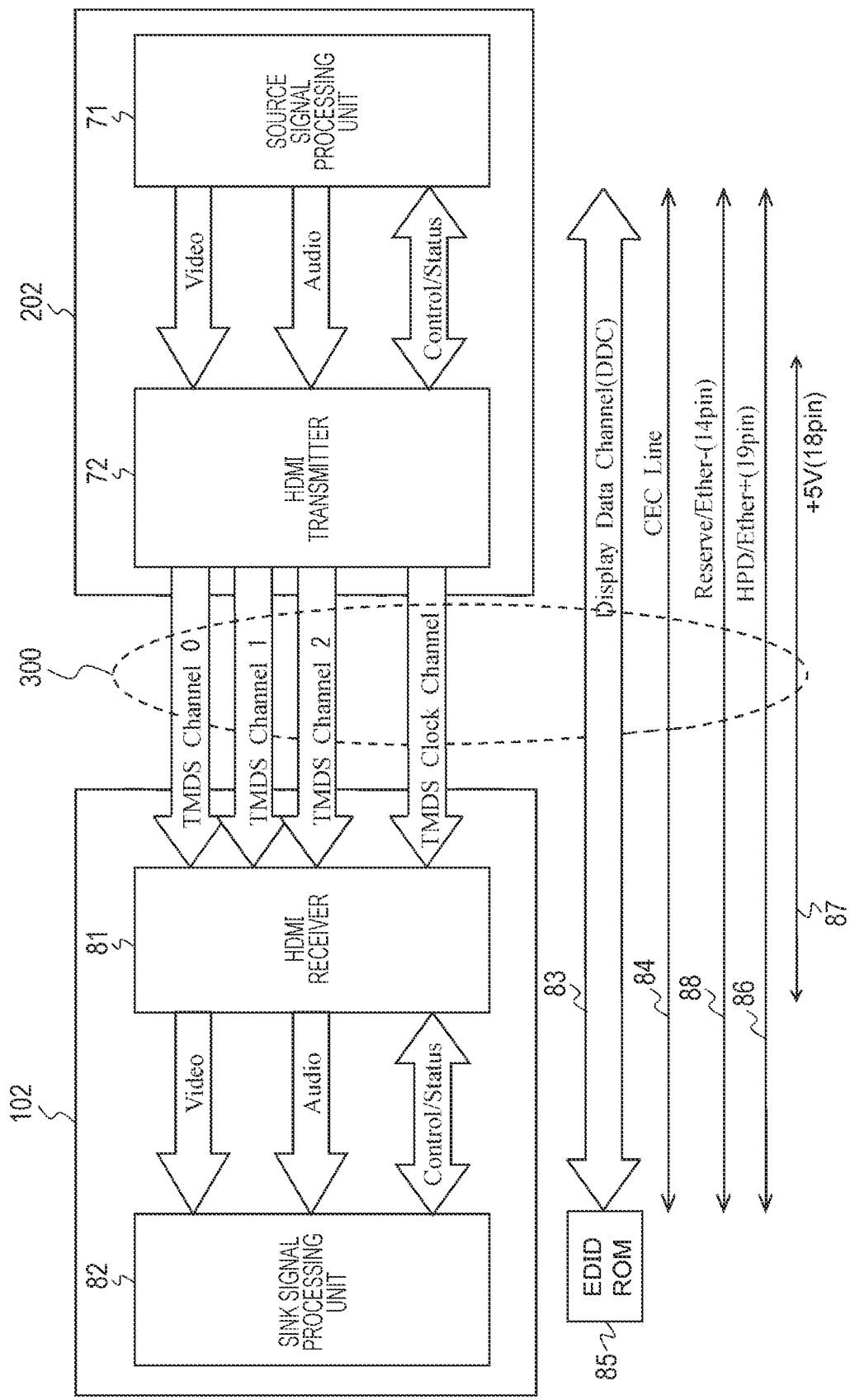
FIG. 3 is a block diagram illustrating a configuration example of an HDMI reception unit of a television receiver and an HDMI transmission unit of an audio amplifier.

FIG. 3 illustrates a configuration example of the HDMI reception unit 102 of the television receiver 100 and the HDMI transmission unit 202 of the audio amplifier 200 in the AV system 10 of FIG. 1.

The HDMI transmission unit 202 transmits, in one direction, differential signals of baseband (uncompressed) image data for one screen to the HDMI reception unit 102 through a plurality of channels, in an effective image section (hereinafter, appropriately referred to as "active video section"), which is a section obtained by excluding a horizontal blanking period and a vertical blanking period from a section ranging from a certain vertical synchronization signal to the next vertical synchronization signal (hereinafter, appropriately referred to as "video field"). Furthermore, in the horizontal blanking period and the vertical blanking period, the HDMI transmission unit 202 transmits, in one direction, differential signals corresponding to audio data and control packets (Control Packets) accompanying the image data, other auxiliary data, and the like to the HDMI reception unit 102 through a plurality of channels.

The HDMI transmission unit 202 includes a source signal processing unit 71 and an HDMI transmitter 72. Baseband uncompressed image (Video) data and audio (Audio) data are supplied to the source signal processing unit 71. The source signal processing unit 71 performs necessary processing on the supplied image data and audio data, and supplies the image data and audio data to the HDMI transmitter 72. In addition, the source signal processing unit 71 exchanges control information, information giving notice of a status (Control/Status), and the like with the HDMI transmitter 72 as needed.

The HDMI transmitter 72 converts the image data supplied from the source signal processing unit 71 into corresponding differential signals, and transmits, in one direction, the differential signals through three TMDS channels #0, #1, and #2, which are the plurality of channels, to the HDMI reception unit 102 connected via the HDMI cable 300.

In addition, the audio data, control packets, and other auxiliary data (auxiliary data) accompanying the uncompressed image data supplied by the transmitter 72 and the source signal processing unit 71 and control data (control data) such as vertical synchronization signals (VSYNC) and horizontal synchronization signals (HSYNC) are converted into corresponding differential signals, and transmitted in one direction through the three TMDS channels #0, #1, and #2 to the HDMI reception unit 102 connected via the HDMI cable 300.

Furthermore, the transmitter 72 transmits, through a TMDS clock channel, a pixel clock synchronized with the image data transmitted through the three TMDS channels #0, #1, and #2, to the HDMI reception unit 102 connected via the HDMI cable 300.

The HDMI reception unit 102 receives the differential signals corresponding to the image data transmitted in one direction from the HDMI transmission unit 202 through the plurality of channels in the active video section, and also receives the differential signals corresponding to the auxiliary data and control data transmitted from the HDMI transmission unit 202 through the plurality of channels in the horizontal blanking period and the vertical blanking period.

The HDMI reception unit 102 includes an HDMI receiver 81 and a sink signal processing unit 82. The HDMI receiver 81 receives the differential signals corresponding to the image data transmitted in one direction through the TMDS channels #0, #1, and #2 from the HDMI transmission unit 202 connected via the HDMI cable 300 and the differential signals corresponding to the auxiliary data and control data, in synchronization with the pixel clock transmitted through the TMDS clock channel similarly from the HDMI transmission unit 202. Furthermore, the HDMI receiver 81 converts the differential signals into corresponding image data, auxiliary data, and control data, and supplies the image data, auxiliary data, and control data to the sink signal processing unit 82 as needed.

The sink signal processing unit 82 performs necessary processing on the data supplied from the HDMI receiver 81 and outputs the data. In addition, the sink signal processing unit 82 exchanges control information, information giving notice of a status (Control/Status), and the like with the HDMI receiver 81, as needed.

HDMI transmission channels include a Display Data Channel (DDC) 83 and a transmission channel called CEC line 84 in addition to the three TMDS channels #0, #1, and #2 for serially transmitting the image data, auxiliary data, and control data in one direction from the HDMI transmission unit 202 to the HDMI reception unit 102 in synchronization with the pixel clock and the TMDS clock channel as a transmission channel for transmitting the pixel clock.

The DDC 83 includes two lines (signal lines) included in the HDMI cable 300, which are not illustrated, and is used in order that a source device reads Enhanced-Extended Display Identification (E-EDID) from a sink device connected via the HDMI cable 300. That is, the sink device includes an EDID ROM 85. The source device reads, via the DDC 83, the E-EDID stored in the EDID ROM 85 from the sink device connected via the HDMI cable 300, and recognizes settings and performance of the sink device on the basis of the E-EDID.

The CEC line 84 includes one line included in the HDMI cable 300, which is not illustrated, and is used for bidirectional communication of the control data between the source device and the sink device.

Furthermore, the HDMI cable 300 also includes a line 86 connected to a pin called hot plug detect (HPD). The source device can detect the connection of the sink device by using the line 86. Furthermore, the HDMI cable 300 also includes a line 87 used to supply power from the source device to the sink device. In addition, the HDMI cable 300 includes a reserve line 88.

Figure 4:
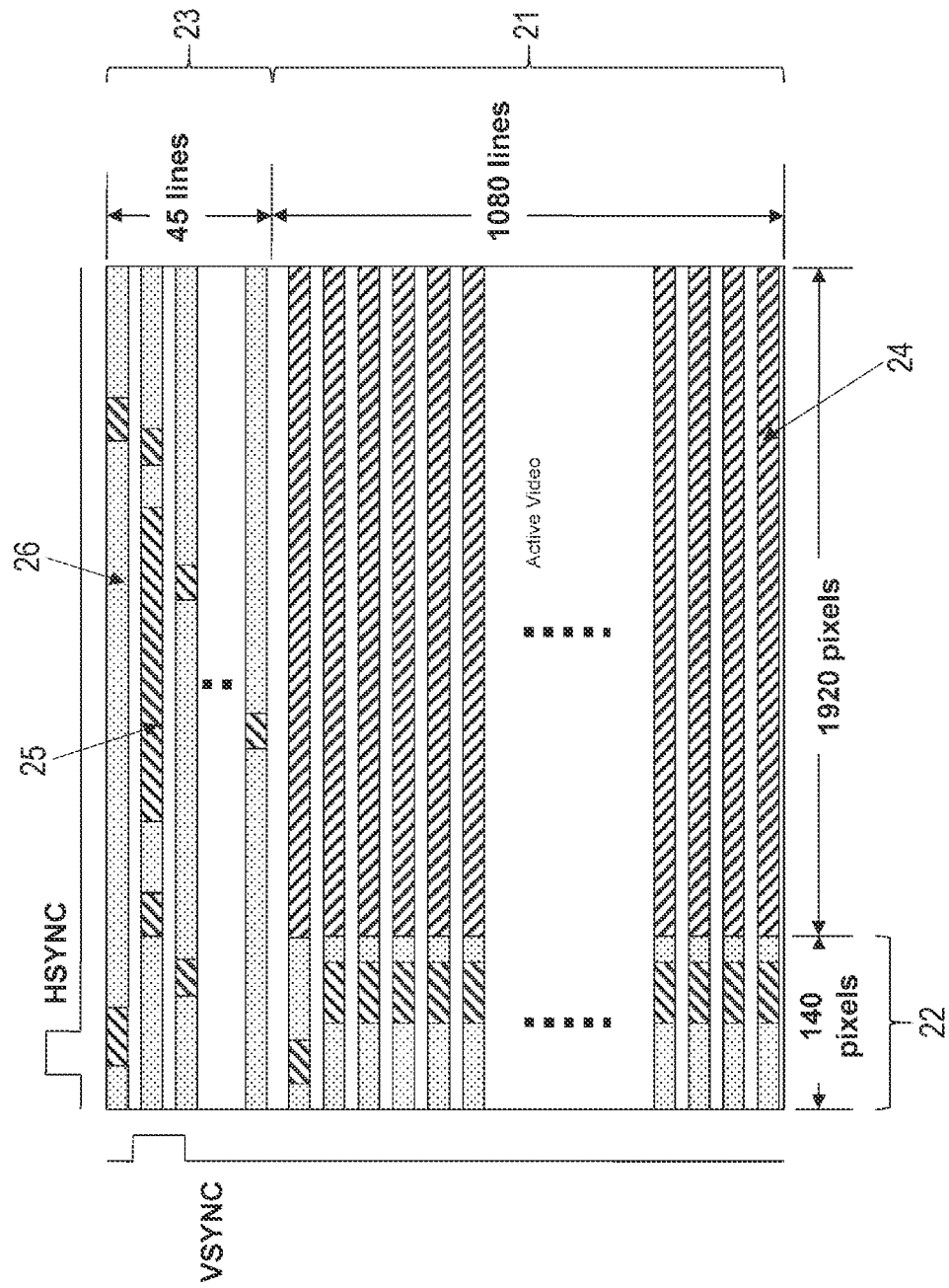
FIG. 4 is a diagram illustrating various transmission data sections in a case where image data of 1920 pixels×1080 lines in width×length is transmitted in TMDS channels.

FIG. 4 illustrates various transmission data sections in a case where image data of 1920 pixels×1080 lines in width× length is transmitted in TMDS channels. In the video field (Video Field) where the transmission data is transmitted through the three HDMI TMDS channels, there are three types of sections, that is, a video data section 24 (Video Data Period), a data island section 25 (Data Island Period), and a control section 26 (Control Period), depending on the type of transmission data.

Here, the video field section is a section ranging from a rising edge (Active Edge) of a certain vertical synchronization signal to a rising edge of the next vertical synchronization signal, and is divided into a horizontal flyback period 22 (Horizontal Blanking), a vertical flyback period 23 (Vertical Blanking), and an effective pixel section 21 (Active Video), which is a section obtained by excluding the horizontal flyback period and the vertical flyback period from the video field section.

The video data section 24 is allocated to the effective pixel section 21. In this video data section 24, data having effective pixels (Active Pixels) of 1920 pixels (pixels)×1080 lines constituting the uncompressed image data for one screen is transmitted. The data island section 25 and the control section 26 are allocated to the horizontal flyback period 22 and the vertical flyback period 23. In the data island section 25 and the control section 26, the auxiliary data (Auxiliary Data) is transmitted.

That is, the data island section 25 is allocated to parts of the horizontal flyback period 22 and the vertical flyback period 23. In the data island section 25, a packet of the audio data and the like as data not related to control, for example, is transmitted out of the auxiliary data. The control section 26 is allocated to other parts of the horizontal flyback period 22 and the vertical flyback period 23. In the control section 26, the vertical synchronization signals, the horizontal synchronization signals, the control packets, and the like as data related to control, for example, are transmitted out of the auxiliary data.

FIG. 5 illustrates a pin arrangement of an HDMI connector. This pin arrangement is an example of type A (type-A). Two lines as differential lines through which TMDS Data #i+ and TMDS Data #i− as differential signals of TMDS channel #i are transmitted are connected to pins to which the TMDS Data #i+ is allocated (pins having pin numbers 1, 4, and 7) and pins to which the TMDS Data #i− is allocated (pins having pin numbers 3, 6, and 9).

Furthermore, the CEC line 84 through which CEC signals as the control data are transmitted is connected to a pin having a pin number 13, and a pin having a pin number 14 is an idle (reserved) pin. In addition, a line through which serial data (SDA) signals of the E-EDID and the like are transmitted is connected to a pin having a pin number 16, and a line through which serial clock (SCL) signals as clock signals used for synchronization at the time of transmission/reception of the SDA signals are transmitted is connected to a pin having a pin number 15. The DDC 83 described above includes the line through which the SDA signals are transmitted and the line through which the SCL signals are transmitted.

Furthermore, as described above, the HPD line 86 for the source device to detect the connection of the sink device is connected to a pin having a pin number 19. In addition, as described above, the power supply line 87 for supplying power is connected to a pin having a pin number 18.

"Configuration Example of High-Speed Bus Interface"

Figure 6:
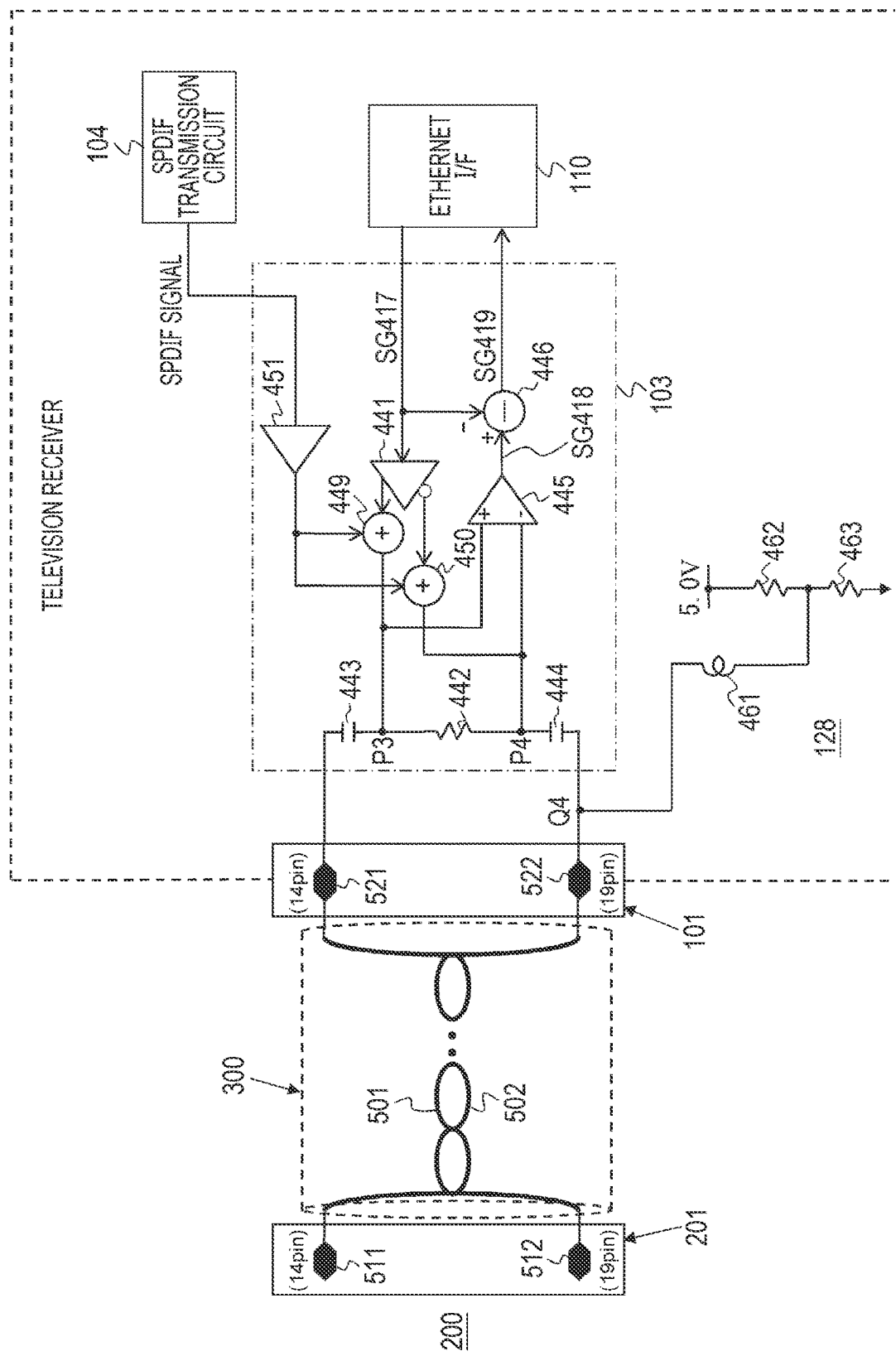
FIG. 6 is a diagram illustrating a configuration example of a high-speed bus interface of the television receiver.

FIG. 6 illustrates a configuration example of the high-speed bus interface 103 of the television receiver 100 in the AV system 10 of FIG. 1. The Ethernet interface 110 performs local area network (LAN) communication, that is, transmission and reception of Ethernet signals by using a transmission line including a pair of lines including the reserve line and the HPD line among the plurality of lines constituting the HDMI cable 300. The SPDIF transmission circuit 104 transmits the SPDIF signals by using the transmission line including the pair of lines described above.

The television receiver 100 includes a LAN signal transmission circuit 441, a terminating resistor 442, AC coupling capacitors 443 and 444, a LAN signal reception circuit 445, a subtraction circuit 446, adder circuits 449 and 450, and an amplifier 451. These constitute the high-speed bus interface 103. Furthermore, the television receiver 100 includes a choke coil 461 and resistors 462 and 463, which constitute a plug connection transmission circuit 128.

A series circuit of the AC coupling capacitor 443, the terminating resistor 442, and the AC coupling capacitor 444 is connected between a 14-pin terminal 521 and a 19-pin terminal 522 of the HDMI terminal 101. Furthermore, a series circuit of the resistors 462 and 463 is connected between a power supply line (+5.0 V) and a ground wire. In addition, a connection point between the resistors 462 and 463 is connected to a connection point Q4 between the 19-pin terminal 522 and the AC coupling capacitor 444 via the choke coil 461.

A connection point P3 between the AC coupling capacitor 443 and the terminating resistor 442 is connected to an output side of the adder circuit 449 and also to a positive input side of the LAN signal reception circuit 445. Furthermore, a connection point P4 between the AC coupling capacitor 444 and the terminating resistor 442 is connected to an output side of the adder circuit 450 and also to a negative input side of the LAN signal reception circuit 445.

One input side of the adder circuit 449 is connected to a positive output side of the LAN signal transmission circuit 441, and the SPDIF signals output from the SPDIF transmission circuit 104 are supplied to the other input side of the adder circuit 449 via the amplifier 451. Furthermore, one input side of the adder circuit 450 is connected to a negative output side of the LAN signal transmission circuit 441, and the SPDIF signals output from the SPDIF transmission circuit 104 are supplied to the other input side of the adder circuit 450 via the amplifier 451.

A transmission signal (transmission data) SG417 is supplied from the Ethernet interface 110 to an input side of the LAN signal transmission circuit 441. Furthermore, an output signal SG418 of the LAN signal reception circuit 445 is supplied to a positive side terminal of the subtraction circuit 446, and the transmission signal SG417 is supplied to a negative side terminal of the subtraction circuit 446. In this subtraction circuit 446, the transmission signal SG417 is subtracted from the output signal SG418 of the LAN signal reception circuit 445, and a reception signal (reception data) SG419 is obtained. In a case where a LAN signal (Ethernet signal) is transmitted as a differential signal via the reserve line and the HPD line, the reception signal SG419 is the LAN signal. The reception signal SG419 is supplied to the Ethernet interface 110.

Figure 7:
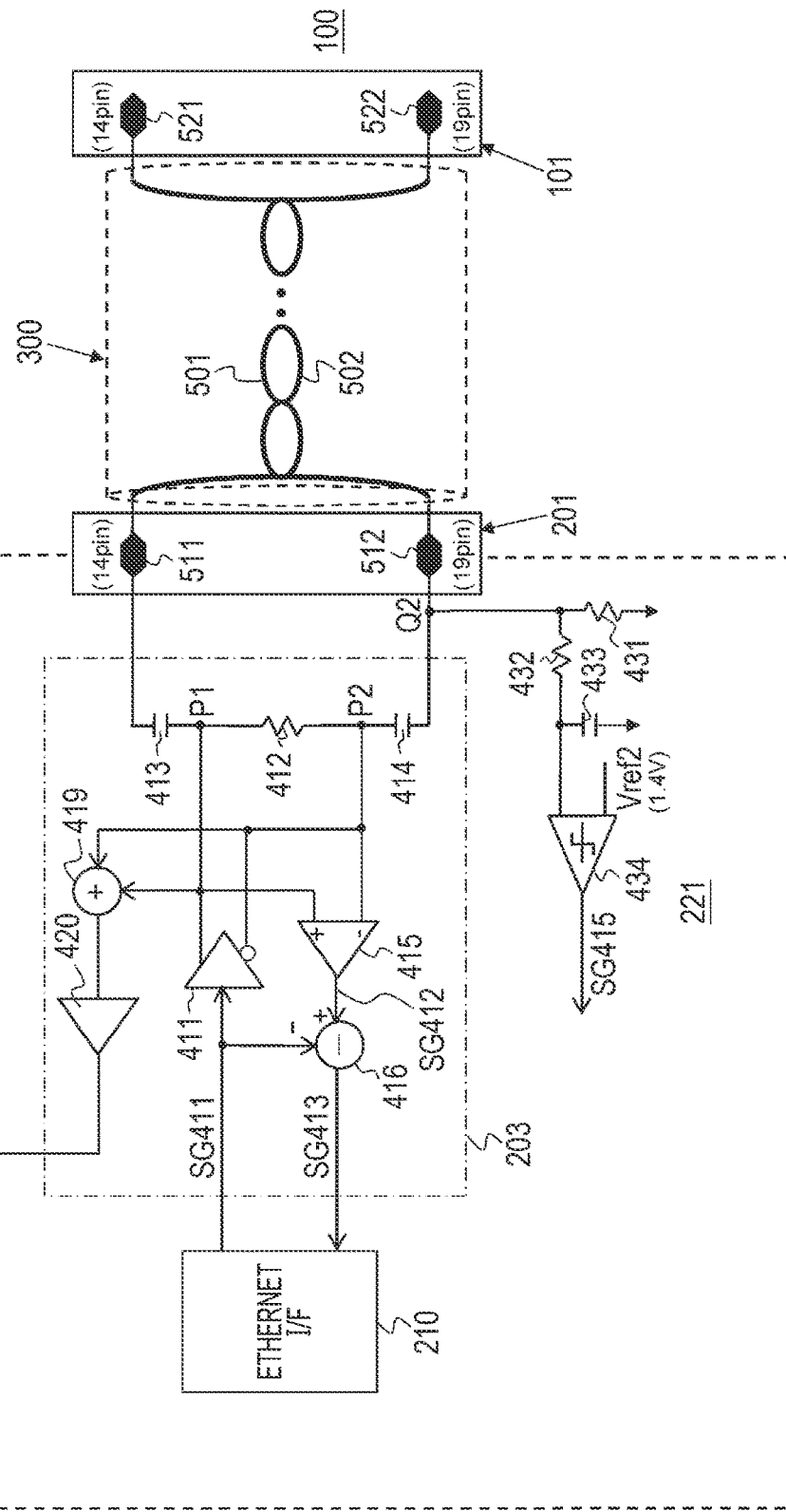
FIG. 7 is a diagram illustrating a configuration example of a high-speed bus interface of the audio amplifier.

FIG. 7 illustrates a configuration example of the high-speed bus interface 203 of the audio amplifier 200 in the AV system 10 of FIG. 1. The Ethernet interface 210 performs local area network (LAN) communication, that is, transmission and reception of the Ethernet signals by using a transmission line including a pair of lines including the reserve line and the HPD line among the plurality of lines constituting the HDMI cable 610. The SPDIF reception circuit 204 receives the SPDIF signals by using the transmission line including the pair of lines described above.

The audio amplifier 200 includes a LAN signal transmission circuit 411, a terminating resistor 412, AC coupling capacitors 413 and 414, a LAN signal reception circuit 415, a subtraction circuit 416, an adder circuit 419, and an amplifier 420. These constitute the high-speed bus interface 203. Furthermore, the audio amplifier 200 includes a pull-down resistor 431, a resistor 432, a capacitor 433, and a comparator 434, which constitute a plug connection detection circuit 221. Here, the resistors 432 and the capacitor 433 constitute a low-pass filter.

A series circuit of the AC coupling capacitor 413, the terminating resistor 412, and the AC coupling capacitor 414 is connected between a 14-pin terminal 511 and a 19-pin terminal 512 of the HDMI terminal 201. A connection point P1 between the AC coupling capacitor 413 and the terminating resistor 412 is connected to a positive output side of the LAN signal transmission circuit 411 and also to a positive input side of the LAN signal reception circuit 415.

A connection point P2 between the AC coupling capacitor 414 and the terminating resistor 412 is connected to a negative output side of the LAN signal transmission circuit 411 and to a negative input side of the LAN signal reception circuit 415. A transmission signal (transmission data) SG411 is supplied from the Ethernet interface 210 to an input side of the LAN signal transmission circuit 411.

An output signal SG412 of the LAN signal reception circuit 415 is supplied to a positive side terminal of the subtraction circuit 416, and the transmission signal (transmission data) SG411 is supplied to a negative side terminal of the subtraction circuit 416. In this subtraction circuit 416, the transmission signal SG411 is subtracted from the output signal SG412 of the LAN signal reception circuit 415, and a reception signal SG413 is obtained. In a case where a LAN signal (Ethernet signal) is transmitted as a differential signal via the reserve line and the HPD line, the reception signal SG413 is the LAN signal. The reception signal SG413 is supplied to the Ethernet interface 210.

A connection point Q2 between the AC coupling capacitor 414 and the 19-pin terminal 512 is connected to a ground wire via the pull-down resistor 431, and is also connected to the ground wire via a series circuit of the resistor 432 and the capacitor 433. In addition, an output signal of the low-pass filter obtained at a connection point between the resistor 432 and the capacitor 433 is supplied to one input terminal of the comparator 434. In this comparator 434, the output signal of the low-pass filter is compared with a reference voltage Vref2 (+1.4V) supplied to the other input terminal. An output signal SG415 of the comparator 434 is supplied to a control unit (CPU) of the audio amplifier 200, which is not illustrated.

Furthermore, the connection point P1 between the AC coupling capacitor 413 and the terminating resistor 412 is connected to one input terminal of the adder circuit 419. In addition, the connection point P2 between the AC coupling capacitor 414 and the terminating resistor 412 is connected to the other input terminal of the adder circuit 419. An output signal of the adder circuit 419 is supplied to the SPDIF reception circuit 204 via the amplifier 420. In a case where an SPDIF signal is transmitted as an in-phase signal via the reserve line and the HPD line, the output signal of the adder circuit 419 is the SPDIF signal.

"Details of SPDIF Signals"

Figure 8:
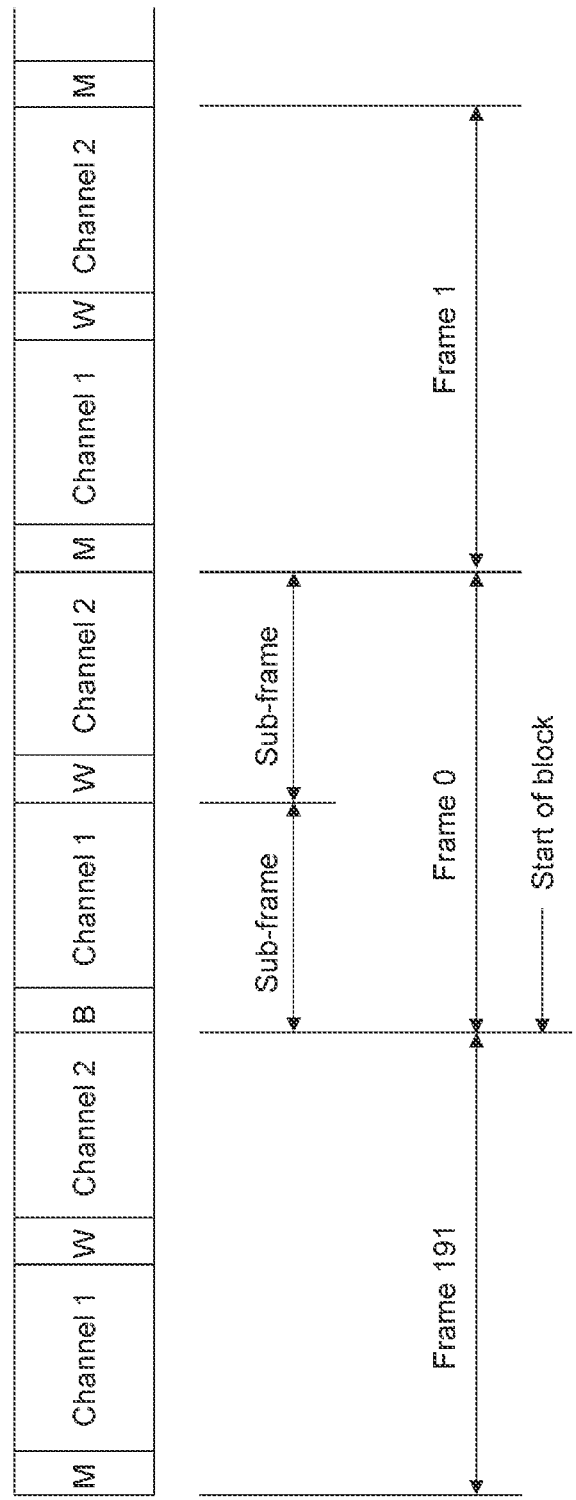
FIG. 8 is a diagram illustrating a frame configuration in the IEC 60958 standard.

First, an overview of the IEC 60958 standard will be described. FIG. 8 illustrates a frame configuration in the IEC 60958 standard. Each frame includes two subframes. In a case of 2-channel stereo audio, a first subframe includes a left channel signal and a second subframe includes a right channel signal.

As will be described later, a preamble is provided at a head of a subframe, and "M" is given as the preamble to the left channel signal and "W" is given as the preamble to the right channel signal. However, "B" expressing the start of a block is given to the preamble at a head of every 192 frames. That is, one block includes 192 frames. The block is a unit that constitutes a channel status described later.

Figure 9:
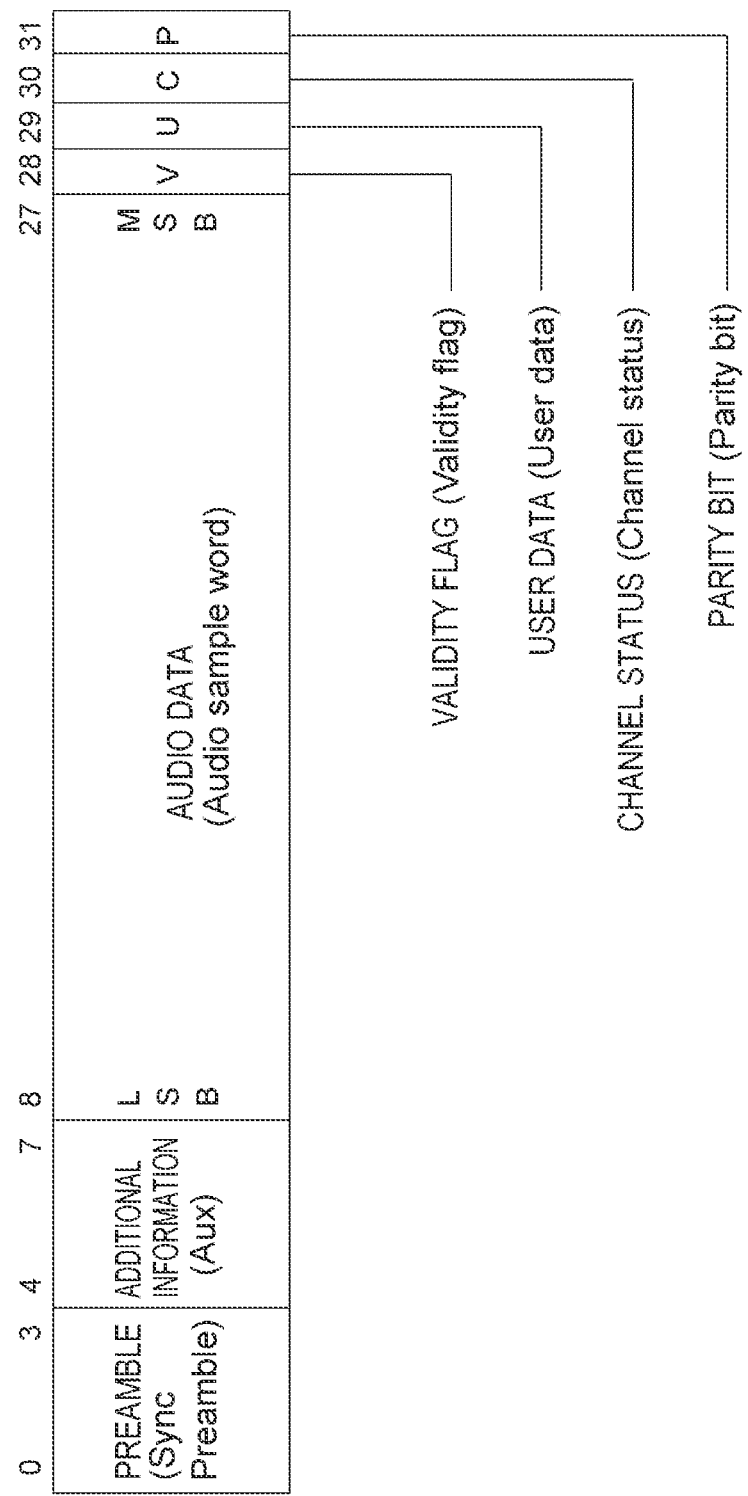
FIG. 9 is a diagram illustrating a subframe configuration in the IEC 60958 standard.

FIG. 9 illustrates a subframe configuration in the IEC 60958 standard. The subframe includes zeroth to 31st time slots, that are a total of 32 time slots. The zeroth to third time slots indicate a preamble (Sync preamble). This preamble indicates one of "M", "W" or "B" in order to distinguish the left and right channels from each other and to express a start position of a block as described above.

The fourth to 27th time slots are a main data field, and in a case where a 24-bit code range is adopted, the entire fourth to 27th time slots express audio data. Furthermore, in a case where a 20-bit code range is adopted, the eighth to 27th time slots express the audio data (Audio sample word). In the latter case, the fourth to seventh time slots can be used as additional information (Auxiliary sample bits). The illustrated example illustrates the latter case.

The 28th time slot is a validity flag (Validity flag) of the main data field. The 29th time slot expresses one bit of user data (User data). Accumulating the 29th time slot across the frames makes it possible to configure a series of user data. A message of the user data includes an 8-bit information unit (Information Unit: IU) as a unit, and one message includes three to 129 information units.

There can be "0" of zero to eight bits among the information units. A head of an information unit is identified by a start bit "1". The first seven information units in the message are reserved, and a user can set any information in eighth and subsequent information units. Messages are divided by "0" of eight bits or more.

The 30th time slot indicates one bit of a channel status (Channel status). Accumulating the 30th time slot for each block across the frames makes it possible to configure a serial channel status. Note that a head position of a block is indicated by the preamble (zeroth to third time slots) of "B" as described above.

The 31st time slot is a parity bit (Parity bit). This parity bit is given so that the number of "0" and "1" included in the fourth to 31st time slots is an even number.

Figure 10:
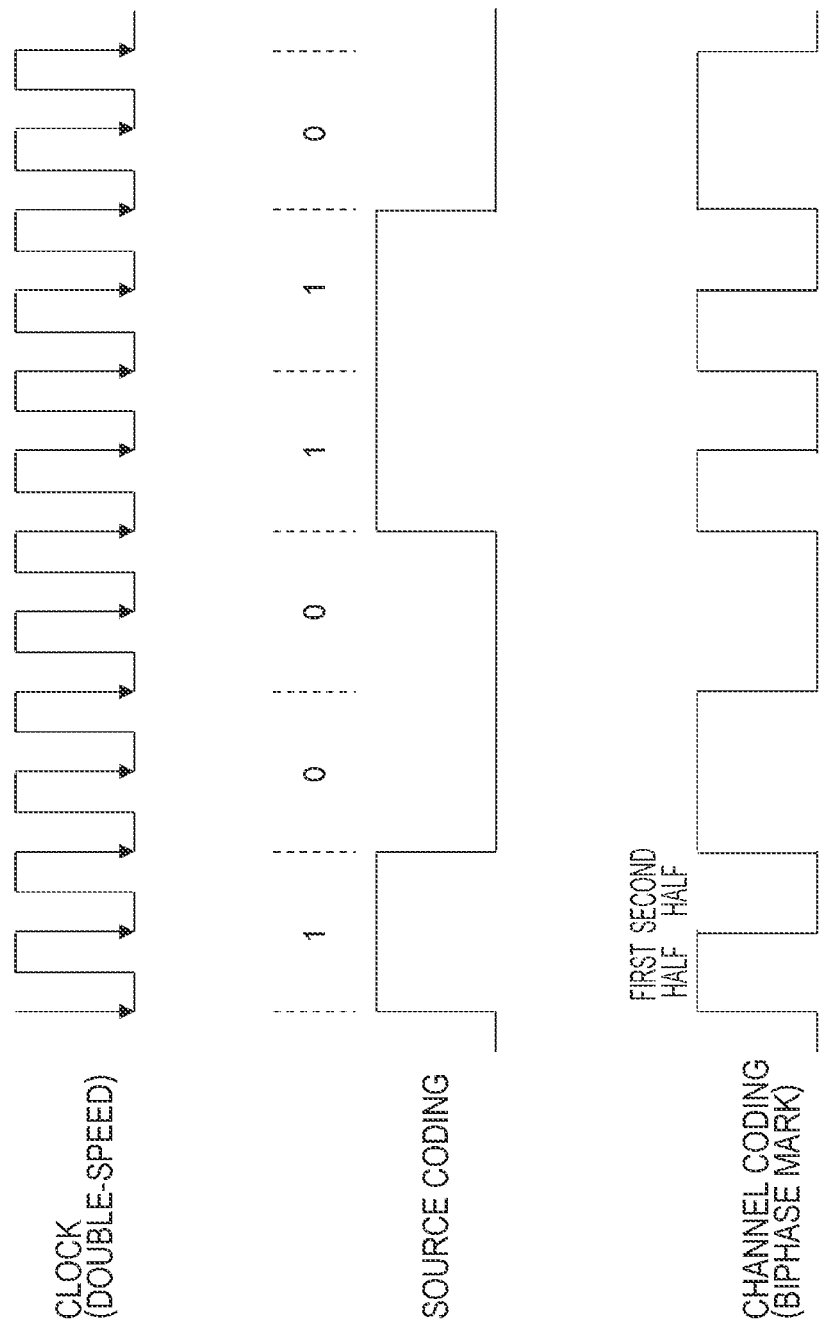
FIG. 10 is a diagram illustrating a signal modulation system in the IEC 60958 standard.

FIG. 10 illustrates a signal modulation system in the IEC 60958 standard. The fourth to 31st time slots excluding the preamble out of the subframe are subjected to biphase mark modulation. In this biphase mark modulation, clocks at twice the speed of original signals (source coding) are used. When a clock cycle of the original signals is divided into a first half and a second half, the output of the biphase mark modulation is always inverted at edges of the clock cycle of the first half. Furthermore, at edges of the clock cycle of the second half, the output of the biphase mark modulation is inverted when the original signals indicate "1", and is not inverted when the original signals indicate "0." With this configuration, it is possible to extract clock components of the original signals from the signals subjected to the biphase mark modulation.

FIG. 11 illustrates channel coding of the preambles in the IEC 60958 standard. As described above, the fourth to 31st time slots of the subframe are subjected to the biphase mark modulation. On the other hand, the preamble of the zeroth to third time slots is treated as a bit pattern synchronized with double-speed clocks without being subjected to the normal biphase mark modulation. That is, two bits are allocated to each time slot of the zeroth to third time slots to obtain an 8-bit pattern as illustrated in the drawing.

If the immediately preceding state is "0", "11101000", "11100010", and "1100100" are allocated to the preambles "B", "M", and "W", respectively. On the other hand, if the immediately preceding state is "1", "00010111", "00011101", and "00011011" are allocated to the preambles "B", "M", and "W", respectively.

"Simultaneous Transmission of Multi-Channel Audio Signals and Tactile Vibration Signals of Predetermined Number of Channels related to First Mode Signals"

The simultaneous transmission of the multi-channel audio signals and the tactile vibration signals of the predetermined number of channels related to the first mode signals will be described. In this case, the transmission is performed by use of a multi-channel transmission format based on the IEC 60958 standard.

Figure 12:
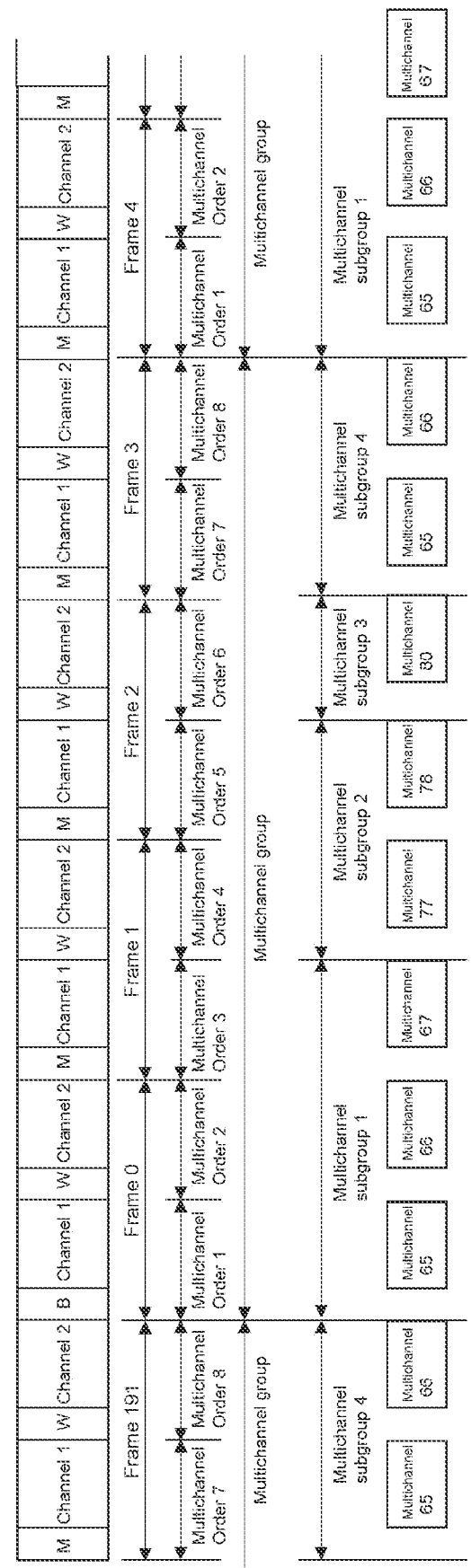
FIG. 12 is a diagram illustrating an example of a frame configuration in a multi-channel transmission format.

First, the multi-channel transmission format will be described. FIG. 12 illustrates an example of a frame configuration in the multi-channel transmission format. In the IEC 60958 standard, one block includes 192 frames, and the 192 frames include repetitions of a multi-channel group (Multichannel group) including a predetermined number of subframes. Each subframe part constitutes a multi-channel order. The number of subframes included in the multi-channel group can be indicated by use of a predetermined bit area of the channel status configured for each block.

Furthermore, one or more multi-channel subgroups each for transmitting the multi-channel audio signals are formed in the multi-channel group. The multi-channel subgroup includes one or more multi-channel orders. Signals of respective channels of the multi-channel audio signals are sequentially arranged in corresponding multi-channel orders included in the multi-channel subgroup. What kind of multi-channel subgroup is formed in the multi-channel group can be indicated by use of a predetermined bit area of the channel status configured for each block, and can also be indicated by use of user data bits of a predetermined number of frames.

In the illustrated example, one multi-channel group includes eight subframes, that is, multi-channel orders 1 to 8. Furthermore, four multi-channel subgroups 1 to 4 are formed in the multi-channel group.

The multi-channel subgroup 1 includes the multi-channel orders 1 to 3, and signals of respective channels of 3-channel multi-channel audio signals (signals having channel numbers 65, 66, and 67) are arranged in order in corresponding multi-channel orders. Here, the channel number 65 indicates a front left (FL), the channel number 66 indicates a front right (FR), and the channel number 67 indicates a front center (FC).

Furthermore, the multi-channel subgroup 2 includes the multi-channel orders 4 and 5, and signals of respective channels of 2-channel multi-channel audio signals (signals having channel numbers 77 and 78) are arranged in order in corresponding multi-channel orders. Here, the channel number 77 indicates a high front left (HFL), and the channel number 78 indicates a front right (HFR).

Furthermore, the multi-channel subgroup 3 includes the multi-channel order 6, and a 1-channel multi-channel audio signal (signal having a channel number 80) is arranged in the multi-channel order. Here, the channel number 80 indicates an overhead center (OhC).

Furthermore, the multi-channel subgroup 4 includes the multi-channel orders 7 and 8, and 2-channel multi-channel audio signals (signals having channel numbers 65 and 66) are arranged in order in the multi-channel orders.

A method of designating the multi-channel subgroup formed in the multi-channel group will be described. As the method of designating the multi-channel subgroup, for example, there are the following first to third methods.

The first method is a method of directly designating the multi-channel subgroup on the basis of multi-channel configuration information stored in bits 63 to 60 of the channel status configured for each block. Here, the multi-channel configuration indicates an audio channel set in which predetermined audio channels are combined in advance. In this first method, only the audio channel set in which predetermined audio channels are combined in advance can be designated.

The second method is a method of designating the channel subgroup by using a multi-channel map stored in bits 165 to 191 of the channel status configured for each block and setting "1" in a bit corresponding to an applicable channel. In this second method, an audio channel set in which any audio channels are combined can be designated, but a transmission order is an order in which the audio channels appear in the multi-channel map, and cannot be in any transmission order.

FIG. 13 schematically illustrates a format of the channel status in the IEC 60958 standard. The channel status is obtained by accumulating the 30th time slots in the subframes for each block (see FIG. 9). In this drawing, contents of the channel status are arranged one byte each in a longitudinal direction, and a bit configuration in each byte is illustrated in a lateral direction. Note that, here, the description will be made assuming a format for consumer use (Consumer use).

A zeroth bit (bit 0) a is set to "0" to indicate that this channel status is for consumer use. Furthermore, a first bit (bit 1) b is set to "0" to indicate that this channel status is a linear PCM sample. In addition, sixth and seventh bits (bits 6-7) indicate a mode of the channel status.

Furthermore, 44th to 47th bits (bits 44-47) constitute a 4-bit field of "Multichannel Count", and the number of subframes included in the multi-channel group is indicated. For example, "0000" indicates 2ch LPCM, that is, the number of subframes included in the multi-channel group is two, "1011" indicates 64ch LPCM, that is, the number of subframes included in the multi-channel group is 64, "1100" indicates 32ch LPCM, that is, the number of subframes included in the multi-channel group is 32, "1101" indicates 16ch LPCM, that is, the number of subframes included in the multi-channel group is 16, "1110" indicates 8ch LPCM, that is, the number of subframes included in the multi-channel group is eight, and "1111" indicates 4ch LPCM, that is, the number of subframes included in the multi-channel group is four.

Furthermore, 53rd to 60th bits constitute an 8-bit field of "Multichannel configuration value", and indicate the value of the multi-channel configuration used for designating the multi-channel subgroup by the first method.

FIG. 14 illustrates a correspondence relationship between values of the multi-channel configuration and audio channel sets indicated by the values. Each audio channel set is determined by ISO/IEC 23001-8 2016 and is identified by the value of the multi-channel configuration. Note that it is also possible to designate an audio channel set prescribed by ITU-R BS.2094-1 or an audio channel set unique to IEC, although these audio channel sets are not illustrated in FIG. 14.

If the value of the multi-channel configuration is "10000000", it is indicated that there is an audio channel set (multi-channel subgroup) with a channel configuration 1 (ChannelConfiguration 1), and this audio channel set includes only an audio channel of "67: FC". Furthermore, if the value of the multi-channel configuration is "01000000", it is indicated that there is an audio channel set (multi-channel subgroup) with a channel configuration 2 (ChannelConfiguration 2), this audio channel set includes audio channels of "65: FL" and "66: FR", and the audio channels are transmitted in this order.

Furthermore, if the value of the multi-channel configuration is "11000000", it is indicated that there is an audio channel set (multi-channel subgroup) with a channel configuration 3 (ChannelConfiguration 3), this audio channel set includes audio channels of "65: FL", "66: FR", and "67: FC", and the audio channels are transmitted in this order. Furthermore, if the value of the multi-channel configuration is "00100000", it is indicated that there is an audio channel set (multi-channel subgroup) with a channel configuration 4 (ChannelConfiguration 4), this audio channel set includes audio channels of "65: FL", "66: FR", "67: FC", and "184: MS", and the audio channels are transmitted in this order.

Furthermore, if the value of the multi-channel configuration is "10100000", it is indicated that there is an audio channel set (multi-channel subgroup) with a channel configuration 5 (ChannelConfiguration 5), this audio channel set includes audio channels of "65: FL", "66: FR", "67: FC", "69: LS", and "70: RS", and the audio channels are transmitted in this order.

Furthermore, if the value of the multi-channel configuration is "01100000", it is indicated that there is an audio channel set (multi-channel subgroup) with a channel configuration 6 (ChannelConfiguration 6), this audio channel set includes audio channels of "65: FL", "66: FR", "67: FC", "68: LFE", "69: LS", and "70: RS", and the audio channels are transmitted in this order.

Furthermore, if the value of the multi-channel configuration is "11100000", it is indicated that there is an audio channel set (multi-channel subgroup) with a channel configuration 7 (ChannelConfiguration 7), this audio channel set includes audio channels of "65: FL", "66: FR", "67: FC", "68: LFE", "69: LS", "70: RS", "109: FLmid", and "110: FRmid", and the audio channels are transmitted in this order.

Here, numbers such as 65, 66, 67, 68, 69, 70, 109, and 110 are audio channel-specific numbers determined by the multi-channel map used in the second method, and each number corresponds to a specific speaker. For example, a front left speaker is the number 65 and a front right speaker is the number 66. These numbers are also used in the third method. These speaker positions and numbers are determined by IEC 62574 based on ITU-R BS.2094-1 and ISO/IEC 23001-8, but are not limited to the determination by this standard, and there may be other channels to be assigned independently. Note that, in a case where the multi-channel configuration value is "00000000", it is indicated that there is no audio channel set (multi-channel subgroup) designated by the first method.

Returning to FIG. 13, a 64th bit (bit 64) indicates whether or not an audio channel set (multi-channel subgroup) is designated by use of the multi-channel map of 65th to 191st bits. For example, "0" indicates that an audio channel set is not designated by use of the multi-channel map, and "1" indicates that an audio channel set is designated by use of the multi-channel map. In the multi-channel map of the 65th to 191st bits, bit numbers directly correspond to channel-specific numbers.

For example, the 65th bit corresponds to the audio channel of "65: FL", and in a case where this audio channel of "65: FL" is included in an audio channel set designated by the second method, "1" is set in the 65th bit. Although detailed description is omitted, the same applies in a case where another audio channel is included in the audio channel set designated by the second method.

The third method is a method of designating the multi-channel subgroup by using user data bits of a predetermined consecutive number of frames. In this third method, an audio channel set in which any audio channels are combined can be designated, and the transmission order of the audio channels can be arbitrarily set.

The third method is a method of packetizing and embedding the multi-channel configuration information by using the user data bits. In this case, first, a packet is sent that specifies the number of speakers for each height. FIG. 15 illustrates an example of the packet. Here, types of height are "Overhead", "High", "Middle", "Bottom", and "LFE". How many speakers are arranged in total in each layer is prescribed. Repeating this mechanism in the packet makes it possible to configure a plurality of multi-channel subgroups. Next, a packet is sent that designates what number of audio channel is transmitted with respect to the transmission order in the multi-channel group. FIG. 16 illustrates an example of the packet.

This third method has the highest degree of freedom as a method of designating an audio channel set (multi-channel subgroup), can transmit specific audio channels in a specific order, and can also transmit the audio channels multiple times.

FIG. 17 illustrates a specific example of the method of designating the multi-channel groups 1 to 4 in the example of the frame configuration in the multi-channel transmission format illustrated in FIG. 12 above. The multi-channel subgroup 1 is designated by the first method. In this case, the value of "Multichannel configuration value" of the 53rd to 60th bits of the channel status is set to "11000000", and it is indicated that there is the audio channel set (multi-channel subgroup) including the audio channels of "65: FL", "66: FR", and "67: FC" (see FIG. 14).

Furthermore, the multi-channel subgroup 2 is designated by the second method. In this case, the 64th bit of the channel status is set to "1" to indicate that there is an audio channel set (multi-channel subgroup) designated by the second method using the multi-channel map. Furthermore, "1" is set in each of 77th and 78th bits to indicate that this audio channel set (multi-channel subgroup) includes the audio channels of "77: HFL" and "78: HFR" in this order.

Furthermore, the multi-channel subgroups 3 and 4 are designated by the third method. In this case, regarding the multi-channel subgroup 3, the packet that specifies the number of speakers for each height (see FIG. 15) indicates that the number of overhead speakers is one, and the packet that designates what number of audio channel is transmitted (see FIG. 16) indicates the audio channel of "80: OhC".

Furthermore, regarding the multi-channel subgroup 4, the packet that specifies the number of speakers for each height (see FIG. 15) indicates that the number of bottom speakers is two, and the packet that designates what number of audio channel is transmitted (see FIG. 16) indicates the audio channels of "65: FL" and "66: FR".

In this embodiment, the multi-channel subgroup designated by the first to third methods described above is used to simultaneously transmit the multi-channel audio signals and the tactile vibration signals of the predetermined number of channels. Note that, at present, ISO/IEC 23001-8 2016 does not define sets including the tactile vibration signals. However, if the sets including the tactile vibration signals are defined in the future, it is also possible to designate a multi-channel subgroup for simultaneously transmitting the multi-channel audio signals and the tactile vibration signals of the predetermined number of channels by the first method.

Furthermore, in order to designate the multi-channel subgroup that simultaneously transmits the multi-channel audio signals and the tactile vibration signals of the predetermined number of channels by the second method, it is conceivable to newly define the tactile vibration signals in undefined bits among the 65th to 191st bits constituting the multi-channel map of the channel status. In this embodiment, for example, as illustrated in FIG. 13, the tactile vibration signals are defined in 120th to 122nd bits.

The tactile vibration signal, which is a type of multimedia signal, is a signal used to vibrate an actuator attached to a human body. Although the tactile vibration signals can be transmitted by use of an uncompressed audio signal transmission line, the signals are biased toward low frequencies. In some cases, the tactile vibration signals may contain DC components to express pressure.

When the tactile vibration signals are reproduced by a conventional audio amplifier, reproduction cannot be performed correctly, an amplification element may be damaged due to heat damage or the like, or, in a case where a speaker is connected, a voice coil may be broken in the worst case. To avoid this problem, unique channel numbers are allocated to the tactile vibration signals to distinguish the tactile vibration signals from audio channel signals. For example, a vibration signal for a right arm is set to a number 120 and is defined in the 120th bit of the multi-channel map. Furthermore, for example, a vibration signal for a left arm is set to a number 121 and is defined in the 121st bit of the multi-channel map. In addition, a vibration signal for both feet is set to a number 122 and is defined in the 122nd bit of the multi-channel map. Note that the tactile vibration signals are not limited to these signals, and other tactile vibration signals may be distinguished from the audio channel signals by being allocated their unique numbers.

Furthermore, it is also possible to use the channel numbers of the tactile vibration signals determined by the second method described above, to designate the multi-channel subgroup for simultaneously transmitting the multi-channel audio signals and the tactile vibration signals of the predetermined number of channels by the third method. Alternatively, it is also possible to determine channel numbers of the tactile vibration signals independently in this third method and operate the channel numbers of the tactile vibration signals independently.

Note that the designation of the multi-channel subgroup for simultaneously transmitting the multi-channel audio signals and the tactile vibration signals of the predetermined number of channels can be changed for each block (192 frames), and, by time division, it is possible to transmit tactile vibration signals of more channels than the number of channels of the tactile vibration signals allocated to the multi-channel subgroup. For example, it is conceivable to attach a large number of vibration units to the whole body of the user and vibrate the vibration units from a lower unit to an upper unit every second.

Figure 18:
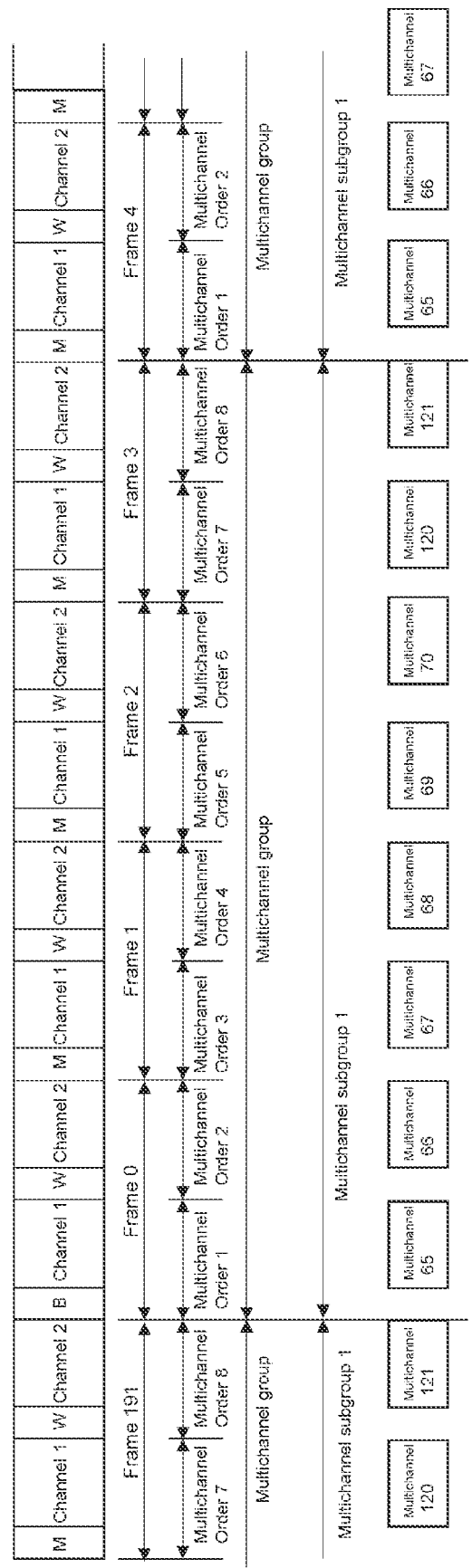
FIG. 18 is a diagram illustrating an example of a frame configuration of a multi-channel transmission format in a case where multi-channel audio signals and tactile vibration signals of a predetermined number of channels are simultaneously transmitted.

FIG. 18 illustrates an example of a frame configuration of a multi-channel transmission format in a case where the multi-channel audio signals and the tactile vibration signals of the predetermined number of channels are simultaneously transmitted. The frame configuration of FIG. 18 is similar to the frame configuration of FIG. 12 as a whole, although detailed description is omitted.

In this example, a multi-channel subgroup 1 as one multi-channel subgroup is formed in a multi-channel group including eight subframes, that is, multi-channel orders 1 to 8. In addition, this example is an example of transmitting 5.1-channel audio and 2-channel tactile vibration signals, as illustrated in FIG. 19, by the one multi-channel subgroup.

Signals of respective channels of the multi-channel audio signals and the tactile vibration signals of the predetermined number of channels (signals of channel numbers 65, 66, 67, 68, 69, 78, 120, and 121) are arranged in order in the multi-channel orders 1 to 8 constituting the multi-channel subgroup 1.

Here, the channel numbers 65 to 70 indicate corresponding audio channels constituting the multi-channel audio signals, "65" indicates the front left (FL), "66" indicates the front right (FR), "67" indicates the front center (FC), "68" indicates LFE, "69" indicates a left surround, and "70" indicates a right surround. Furthermore, the channel numbers 120 and 121 indicate corresponding channels of the tactile vibration signals, "120" indicates a left hand (vibration signal for the right arm), and "121" indicates a right hand (signal for the left arm signal).

Note that, in the frame configuration of FIG. 18, an example is shown in which one multi-channel subgroup is formed in the multi-channel group, but it is also conceivable to form a plurality of multi-channel subgroups in the multi-channel group. In addition, cases are also conceivable where only signals of respective channels of the multi-channel audio signals are arranged in a part of the multi-channel subgroups, or where only signals of respective channels of the tactile vibration signals of the predetermined number of channels are arranged in some multi-channel subgroups, not only the case where the signals of the respective channels of the multi-channel audio signals and the tactile vibration signals of the predetermined number of channels are arranged in order in all the multi-channel subgroups.

It is also possible to designate, by the above-described first to third methods, the multi-channel subgroup in which the signals of the respective channels of the multi-channel audio signals and the tactile vibration signals of the predetermined number of channels are arranged in order. Designation information in this case also serves as configuration information of the multi-channel audio signals and the tactile vibration signals of the predetermined number of channels. This configuration information includes identification information for distinguishing the tactile vibration signals from the audio signals. Furthermore, this identification information includes information regarding a vibration position targeted by each of the tactile vibration signals of the predetermined number of channels.

FIG. 20 illustrates a case of designating, by the second method, the multi-channel subgroup 1 in the example of the frame configuration in the multi-channel transmission format illustrated in FIG. 18 above. In this case, the 64th bit of the channel status (see FIG. 13) is set to "1" to indicate that there is the multi-channel subgroup designated by the second method using the multi-channel map.

In addition, "1" is set in each of the 65th to 70th bits and the 120th and 121st bits of the channel status, it is indicated that this multi-channel subgroup includes the audio channels of "65: FL", "66: FR", "67: FC", "68: LFE", "69: LS", and "70: RS" in this order, and also includes the tactile vibration signal channels of "120: Left Hand" and "121: Left Hand" in this order.

"Transmission of Only Tactile Vibration Signals of Predetermined Number of Channels related to Second Mode Signals"

The transmission of only the tactile vibration signals of the predetermined number of channels related to the second mode signals will be described. In this case as well, the transmission is performed by use of a multi-channel transmission format based on the IEC 60958 standard.

The IEC 60958 standard has three systems of the sampling frequency: 32 kHz, 44.1 kHz, and 48 kHz. Here, 32 kHz is used in a broadcasting system, 44.1 kHz is used in a CD system, and 48 kHz is used in an audio-video system. As the sampling frequency of the tactile vibration signal, a series of 3 kHz, 6 kHz, 12 kHz, and the like, which has a good affinity with 48 kHz, is adopted in consideration of synchronization with the video signals.

Since 48 kHz is 16 times 3 kHz and 16 is the factorial of 2, downsampling processing and upsampling processing can be performed simply. That is, it is sufficient that, when the tactile signals are actually sampled, the tactile signals are sampled at 48 kHz, and downsampled to 3 kHz, 6 kHz, 12 kHz, and the like, and at the time of reproduction, the tactile signals sampled at 3 kHz, 6 kHz, 12 kHz, and the like are upsampled to 48 kHz. Since 48 kHz is widely supported by audio devices, the sampling processing of the tactile signals can be implemented at low cost.

For example, transmitting tactile vibration signals of 3 kHz-sampling at 16 times speed through 32 channels makes it possible to transmit the tactile vibration signals at the same speed as LPCM 2ch transmission of 48 kHz-sampling. Furthermore, for example, transmitting tactile vibration signals of 6 kHz-sampling at eight times speed through 16 channels makes it possible to transmit the tactile vibration signals at the same speed as the LPCM 2ch transmission of 48 kHz-sampling.

Figure 21:
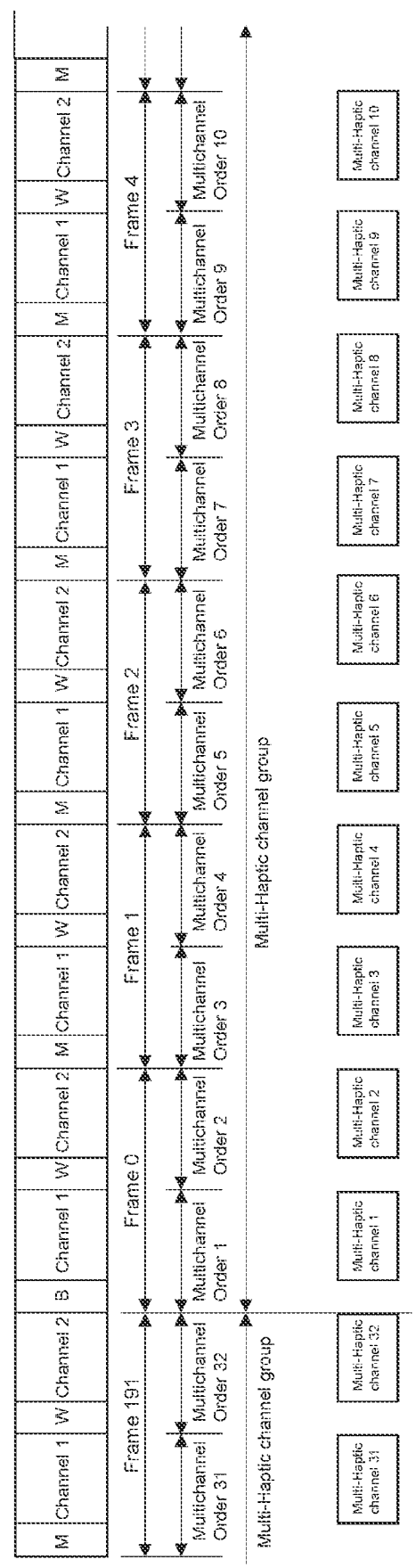
FIG. 21 is a diagram illustrating an example of the frame configuration of the multi-channel transmission format (multi-tactile signal format) in a case of transmitting the tactile vibration signals of the predetermined number of channels.

FIG. 21 illustrates an example of a frame configuration in a multi-channel transmission format in a case of transmitting the tactile vibration signals of the predetermined number of channels, that is, a multi-tactile signal format. As described above, in the IEC 60958 standard, one block includes 192 frames, and the 192 frames include repetitions of a multi-haptic channel group (Multi-Haptic channel group) including a predetermined number of subframes. Each subframe part constitutes a multi-channel order.

The number of subframes included in the multi-haptic channel group is a value corresponding to the number of channels. For example, in a case of transmitting the tactile vibration signals of 3 kHz-sampling at 16 times speed through 32 channels, the number of subframes included in the multi-haptic channel group is 32. Furthermore, for example, in a case of transmitting the tactile vibration signals of 6 kHz-sampling at 8 times speed through 16 channels, the number of subframes included in the multi-haptic channel group is 16.

In addition, the multi-haptic channel group includes a plurality of multi-channel orders. The tactile vibration signal of each channel is sequentially arranged in a corresponding multi-channel order constituting this multi-haptic channel group. In the illustrated example, the case is shown where the tactile vibration signals of 3 kHz-sampling are transmitted at 16 times speed through 32 channels.

Here, since one block includes 192 frames, 48 kHz-LPCM obtains 192×2/2=192 samples. In the case of 3 kHz-32 channels, the number of samples per channel is 192×2/32=12 samples, which is 1/16 of 192 samples, and in the case of 6 kHz-16 channels, the number of samples per channel is 192×2/16=24 samples, which is 1/8 of 192 samples.

Note that the number of transmission channels can be increased by assigning multi-channel tactile vibration signals, instead of assigning a 1-channel tactile vibration signal, to a 24-bit slot in a subframe of IEC 60958-1. For example, as illustrated in FIG. 22, the number of transmission channels is tripled in a case where the 24-bit slot in the subframe is divided into three by 8 bits and 3-channel tactile vibration signals are assigned. Furthermore, for example, although not illustrated, the number of transmission channels is doubled in a case where the 24-bit slot in the subframe is divided into two by 12 bits and 2-channels tactile vibration signals are assigned.

Here, it is also conceivable to divide the 24-bit slot with weighting processing instead of dividing the 24-bit slot equally. For example, in a case where the 24-bit slot in the subframe is divided into three, it is possible to divide the 24-bit slot into 10 bits, 7 bits, and 7 bits instead of equally dividing the 24-bit slot into 8 bits each.

Furthermore, in the LPCM format, the sampling frequency is doubled when a transmission frequency is doubled. However, in the case of the multi-tactile signal format, the sampling frequency is the same and the number of channels is doubled. FIG. 23 illustrates an example of correspondence between LPCM formats and multi-tactile signals.

For example, in a case where the transmission frequency is 128×48 kHz, multi-tactile signal formats of 3 kHz-32 channels-24 bits, 3 kHz-96 channels-8 bits, and 3 kHz-64 channels-12 bits correspond to an LPCM format of 48 kHz-2 channels-24 bits. Furthermore, for example, in a case where the transmission frequency is 128×96 kHz, multi-tactile signal formats of 3 kHz-64 channels-24 bits, 3 kHz-192 channels-8 bits, and 3 kHz-128 channels-12 bits correspond to an LPCM format of 96 kHz-2 channels-24 bits.

Note that, in a channel status, since one block includes 192 bits, the maximum number of channels that can be identified is 384 channels (768 channels in the case of division into two, and 1152 channels in the case of division into three).

The multi-tactile signal format is identified by use of the channel status configured for each block. In addition, the configuration information of the tactile vibration signals of the predetermined number of channels to be transmitted is added to this channel status.

FIG. 24 schematically illustrates a format of the channel status in the IEC 60958 standard. The channel status is obtained by accumulating the 30th time slots in the subframes for each block (see FIG. 9). In this drawing, contents of the channel status are arranged one byte each in a longitudinal direction, and a bit configuration in each byte is illustrated in a lateral direction. Note that, here, the description will be made assuming a format for consumer use (Consumer use).

A zeroth bit (bit 0) a is set to "0" to indicate that this channel status is for consumer use. Furthermore, a first bit (bit 1) b is set to "0" to indicate that this channel status is a linear PCM sample. In addition, sixth and seventh bits (bits 6-7) indicate a mode of the channel status.

Note that three bits from third to fifth bits are "000" in the LPCM format, and even if three bits from third to fifth bits in the multi-tactile signal format have the same value, the format operates sufficiently. However, the multi-tactile signal format may have a different value to be distinguished from the LPCM format. In the illustrated example, the value is "001".

Fields of 24th to 27th bits and 30th and 31st bits (bits 24-27 and 30-31) indicate the sampling frequency such as 48 kHz, 96 kHz, or 192 kHz, that is, a frame rate. A field of 49th to 52nd bits (bits 49-52) constitutes a 4-bit field of "Multichannel Configuration type". For example, "1100" is set to indicate a tactile vibration mode, that is, the multi-tactile signal format.

Furthermore, 53rd to 60th bits (bits 53-60) constitute an 8-bit field of "Multichannel Configuration value", and indicate a tactile vibration signal mode (Haptic mode). Here, this mode information includes information regarding the sampling frequency and a bit depth as the configuration information of the tactile vibration signals of the predetermined number of channels. The number of channels of the tactile vibration signals transmitted can be specified from this mode information and the frame rate information described above (see FIG. 23).

FIG. 25 illustrates an example of a correspondence relationship between values of "Multichannel Configuration value" and tactile vibration signal modes. Note that this example illustrates an example without vibration point information. For example, "10000000" indicates that the sampling frequency is 3 kHz and the bit depth is 24 bits (without vibration point information). Furthermore, for example, "01000000" indicates that the sampling frequency is 3 kHz and the bit depth is 12 bits (without vibration point information).

In the case of the mode in which there is no vibration point information, that is, the mode in which vibration points are not designated as described above, the vibration points are designated in a transmission line different from an IEC 60958 transmission line, or determined in advance. Regarding the designation in a different transmission line, CEC or HEC (Ethernet) is used in the HDMI. Furthermore, regarding the determination in advance, for example, there is a case where the vibration points are arranged on a plane longitudinally and laterally in order, and channel numbers are allocated to the vibration points in order. In this case, when a person touches the plane, vibrations are transmitted according to the place that the person touches.

FIG. 26 illustrates another example of the correspondence relationship between values of the 8-bit field of "Multichannel Configuration value" and tactile vibration signal modes. Note that this example illustrates an example with vibration point information. For example, "10000001" indicates that the sampling frequency is 3 kHz and the bit depth is 24 bits (with vibration point information). Furthermore, for example, "01000001" indicates that the sampling frequency is 3 kHz and the bit depth is 12 bits (with vibration point information).

In the case of the mode in which there is vibration point information, that is, the mode in which the vibration points are designated as described above, a combination of specific vibration points is prescribed in advance according to the number of channels, and is referred to when the tactile vibration signals of the predetermined number of channels are reproduced. FIG. 27 illustrates an example of 32-channel vibration points.

Note that further subdividing intervals of the vibration points or forming the vibration points into a matrix shape makes it possible to further increase the number of channels. Specifically, the matrix shape indicates a case where, for example, there are a total of 80 channels of five by eight in length and width. Furthermore, in a case where the vibration points are different even if the sampling frequency and the bit depth are the same, new bits are assigned and used. Specifically, for example, "10000001" indicating 3 kHz-24 bits (with vibration point information) is set, and "10000011" indicating 3 kHz-24 bits (with vibration point information different from the above vibration point information) is set. Furthermore, it is not necessary to support all combinations, but it is sufficient to enter combinations actually used.

Furthermore, in the above description, the 8-bit field of "Multichannel Configuration value" indicates information regarding the sampling frequency and the bit depth as the configuration information of the tactile vibration signals of the predetermined number of channels, but it is also conceivable to indicate the information regarding the sampling frequency and the information regarding the bit depth in separate fields and use these pieces of information in combination. Furthermore, in the above description, the tactile vibration signal mode (Haptic mode) is indicated by the 8-bit field of "Multichannel Configuration value" of the channel status, but the mode can also be designated by the user data. Furthermore, it is also possible to designate the vibration points corresponding to the channels with this user data.

As described above, in the AV system 10 illustrated in FIG. 1, transmission signals for each block including a plurality of frames for audio signals are used so that it is possible to selectively, easily, and readily transmit multi-channel audio signals and tactile vibration signals of a predetermined number of channels related to first mode signals, or tactile vibration signals of a predetermined number of channels related to second mode signals.

In this case, in the case of handling the first mode signals, the signals for each block including 192 frames, which include the audio signals of a predetermined number of channels and the tactile vibration signals of the predetermined number of channels, are transmitted from the television receiver 100 to the audio amplifier 200 via the HDMI cable 300. Therefore, the tactile vibration signals can be satisfactorily transmitted from the television receiver 100 to the audio amplifier 200 in synchronization with the audio signals.

Furthermore, in the case of handling the second mode signals, the signals for each block including 192 frames, which include the tactile vibration signals of the predetermined number of channels, are transmitted from the television receiver 100 to the audio amplifier 200 via the HDMI cable 300. Therefore, only the tactile vibration signals can be satisfactorily transmitted from the television receiver 100 to the audio amplifier 200.

Note that the effects described in the present specification are merely examples, are not limited, and may have additional effects.

2. MODIFIED EXAMPLE

Note that, in the above-described embodiment, an example of the AV system 10 is shown in which the multi-channel audio signals and the tactile vibration signals of the predetermined number of channels related to the first mode signals or the tactile vibration signals of the predetermined number of channels related to the second mode signals are transmitted from the television receiver 100 to the audio amplifier 200 by use of the IEC 60958 transmission line. However, the AV system to which the present technology can be applied is not limited to this.

FIG. 28A illustrates a configuration example of an AV system 30 to which the present technology can be applied. This AV system 10A includes a BD player 310, a massage chair 320 with speakers, and a television receiver 330. In this case, although detailed description is omitted, the massage chair 320 with the speakers has functions similar to the audio amplifier 200, the speaker system 250, and the vibration system 260 in the AV system 10 described above.

In a case where the BD player 310 reproduces first mode signals (video signals, multi-channel audio signals, and tactile vibration signals of a predetermined number of channels), the video signals are transmitted to the television receiver 330 through, for example, an HDMI transmission line, to display an image.

Furthermore, in this case, the multi-channel audio signals and the tactile vibration signals of the predetermined number of channels are transmitted to the massage chair 320 with the speakers through the IEC 60958 transmission line (see FIG. 18), and audio output from the speakers and vibration generation from the vibration system, which is related to the audio and images, are performed in synchronization. With this configuration, viewing/listening effects of the content for a viewer/listener are enhanced. Note that, in this case, it is not always necessary to generate the vibrations related to the audio and images, and vibrations for massage may be generated to relieve the viewer/listener of fatigue caused by the viewing/listening.

On the other hand, in a case where the BD player 310 reproduces second mode signals (tactile vibration signals of a predetermined number of channels), the tactile vibration signals of the predetermined number of channels are transmitted to the massage chair 320 with the speakers through the IEC 60958 transmission line (see FIG. 21), and the vibration system performs vibration generation to give the viewer/listener vibrations for massage, healing or the like, for example.

FIG. 28B illustrates a configuration example of an AV system 40 to which the present technology can be applied. This AV system 10A includes a BD player 310 and a massage chair 420 with a display and speakers. In this case, although detailed description is omitted, the massage chair 320 with the display and the speakers includes the display in addition to having functions similar to the audio amplifier 200, the speaker system 250, and the vibration system 260 in the AV system 10 described above.

In a case where the BD player 410 reproduces the first mode signals (video signals, multi-channel audio signals, and tactile vibration signals of a predetermined number of channels), the video signals are transmitted to the massage chair 420 through, for example, the HDMI transmission line, to display an image on the display.

Furthermore, in this case, the multi-channel audio signals and the tactile vibration signals of the predetermined number of channels are transmitted to the massage chair 420 through the IEC 60958 transmission line, and audio output from the speakers and vibration generation from the vibration system, which is related to the audio and images, are performed in synchronization. With this configuration, the viewing/listening effects of the content for the viewer/listener are enhanced. Note that, in this case, it is not always necessary to generate the vibrations related to the audio and images, and vibrations for massage may be generated to relieve the viewer/listener of fatigue caused by the viewing/listening.

On the other hand, in a case where the BD player 410 reproduces the second mode signals (tactile vibration signals of a predetermined number of channels), the tactile vibration signals of the predetermined number of channels are transmitted to the massage chair 420 through the IEC 60958 transmission line, and the vibration system performs vibration generation to give the viewer/listener vibrations for massage, healing or the like, for example.

Furthermore, in the above description, the example of the massage chair is given as an example in which the vibration system is provided, but, in addition, the present technology can be applied to airplane seats, train seats, car seats, cradles, beds including nursing beds and fatigue recovery beds, sofas, game machine seats, movie theater seats, and the like. Note that, in the case of the airplane seats, train seats, bus seats, and the like, it is also conceivable to generate vibrations that cancel vibrations coming from the vehicles themselves.

Note that, in the above-described embodiment, the example of using HDMI ARC as the IEC 60958 transmission line is shown, but an example of using a coaxial cable or an optical cable as the IEC 60958 transmission line is also conceivable. In addition, an example of using the HDMI transmission line as the IEC 60958 transmission line is also conceivable. In this case, the SPDIF signals (IEC 60958 signals) are mapped to an audio sample packet (audio sample packet) and transmitted in a forward direction, as in video transmission. Similarly, as the IEC 60958 transmission line, an example of using an IEC 61883-6 transmission line, an MHL transmission line, a display port transmission line (DP transmission line), or the like is also conceivable. In these cases as well, the SPDIF signals (IEC 60958 signals) are mapped to the audio sample packet (audio sample packet) and transmitted in the forward direction, as in the video transmission.

Furthermore, although the preferred embodiment of the present disclosure has been described above in detail with reference to the accompanying drawings, the technical scope of the present disclosure is not limited to this example. It is obvious that those having ordinary knowledge in the technical field of the present disclosure can conceive various changes or modifications within the scope of the technical idea described in the claims, and of course, it is understood that these changes and modifications also belong to the technical scope of the present disclosure.

Furthermore, the technology may have the following configurations.

(1) A transmission device including
  a transmission unit that sequentially transmits a transmission signal for each block including a plurality of frames for an audio signal to a receiving side via a predetermined transmission line, in which
the transmission signal includes a tactile vibration signal of a predetermined number of channels.
(2) The transmission device according to (1), further including
an information addition unit that adds, to the transmission signal, configuration information of the tactile vibration signal of the predetermined number of channels.
(3) The transmission device according to (2), in which
the configuration information includes information regarding a sampling frequency of the tactile vibration signal.
(4) The transmission device according to (2) or (3), in which
the configuration information includes information regarding a bit depth of the tactile vibration signal.
(5) The transmission device according to any of (2) to (4), in which
the configuration information includes information regarding the predetermined number of channels.
(6) The transmission device according to any of (2) to (5), in which
the configuration information includes information indicating presence or absence of vibration point information.
(7) The transmission device according to any of (2) to (6), in which
the information addition unit adds the configuration information by use of a predetermined bit area of a channel status configured for each block.
(8) The transmission device according to any of (1) to (7), in which
the predetermined transmission line includes a coaxial cable, an optical cable, an Ethernet (IEC 61883-6) cable, an HDMI cable, an MHL cable, or a display port cable.
(9) A transmission method including
a step of sequentially transmitting a transmission signal for each block including a plurality of frames for an audio signal to a receiving side via a predetermined transmission line, in which
the transmission signal includes a tactile vibration signal of a predetermined number of channels.
(10) A reception device including
a reception unit that sequentially receives a transmission signal for each block including a plurality of frames for an audio signal from a transmitting side via a predetermined transmission line, in which
the transmission signal includes a tactile vibration signal of a predetermined number of channels.
(11) The reception device according to (10), further including
a processing unit that processes the transmission signal and outputs the tactile vibration signal of the predetermined number of channels.
(12) The reception device according to (11), in which
the transmission signal includes configuration information of the tactile vibration signal of the predetermined number of channels, and
the processing unit processes the transmission signal on the basis of the configuration information and outputs the tactile vibration signal of the predetermined number of channels.
(13) The reception device according to (12), in which
the configuration information is added by use of a predetermined bit area of a channel status configured for each block.
(14) The reception device according to any of (10) to (13), in which
the predetermined transmission line includes a coaxial cable, an optical cable, an Ethernet (IEC 61883-6) cable, an HDMI cable, an MHL cable, or a display port cable.
(15) A reception method including
a step of sequentially receiving a transmission signal for each block including a plurality of frames for an audio signal from a transmitting side via a predetermined transmission line, in which
the transmission signal includes a tactile vibration signal of a predetermined number of channels.
(16) A transmission device including
a transmission unit that sequentially transmits a transmission signal for each block including a plurality of frames for an audio signal to a receiving side via a predetermined transmission line, in which
the transmission signal selectively includes a first mode signal including an audio signal of a predetermined number of channels or a second mode signal including only a tactile vibration signal of a predetermined number of channels.
(17) A reception device including
a reception unit that sequentially receives a transmission signal for each block including a plurality of frames for an audio signal from a transmitting side via a predetermined transmission line, in which
the transmission signal selectively includes a first mode signal including an audio signal of a predetermined number of channels or a second mode signal including only a tactile vibration signal of a predetermined number of channels.

REFERENCE SIGNS LIST 10, 30, 40 AV system
100 Television receiver
101 HDMI terminal
102 HDMI reception unit
103 High-speed bus interface
104 SPDIF transmission circuit
105 System controller
107 Digital broadcast reception circuit
108 Content reproduction circuit
109 Display unit
110 Ethernet interface
121 Reception antenna
122 BD player
123 Internet
200 Audio amplifier
201 HDMI terminal
202 HDMI transmission unit
203 High-speed bus interface
204 SPDIF reception circuit
205 System controller
208 Audio amplifier
209 Vibration amplifier
210 Ethernet interface
250 Speaker system
260 Vibration system
300 HDMI cable
310 BD player
320 Massage chair with speakers 330 Television receiver
410 BD player
420 Massage chair with display and speakers

The invention claimed is:
1. A transmission device, comprising:
a transmission unit configured to sequentially transmit a transmission signal for each of a plurality of blocks to a receiving side via a specific transmission line, wherein
  each of the plurality of blocks includes a plurality of frames for an audio signal, and
  the transmission signal includes a tactile vibration signal of a specific number of channels; and
an information addition unit configured to add configuration information of the tactile vibration signal to the transmission signal.
2. The transmission device according to claim 1, wherein the configuration information includes information regarding a sampling frequency of the tactile vibration signal.
3. The transmission device according to claim 1, wherein the configuration information includes information regarding a bit depth of the tactile vibration signal.
4. The transmission device according to claim 1, wherein the configuration information includes information regarding the specific number of channels.
5. The transmission device according to claim 1, wherein the configuration information includes information that indicates presence or absence of vibration point information.
6. The transmission device according to claim 1, wherein the information addition unit is further configured to add the configuration information based on a specific bit area of a channel status configured for each block.
7. The transmission device according to claim 1, wherein the specific transmission line includes at least one of a coaxial cable, an optical cable, an Ethernet (IEC 61883-6) cable, an HDMI cable, an MHL cable, or a display port cable.
8. A transmission method, comprising:
sequentially transmitting, by a transmission unit, a transmission signal for each of a plurality of blocks to a receiving side via a specific transmission line, wherein
  each of the plurality of blocks includes a plurality of frames for an audio signal, and
  the transmission signal includes a tactile vibration signal of a specific number of channels; and
adding, by an information addition unit, configuration information of the tactile vibration signal to the transmission signal.
9. A reception device, comprising:
a reception unit configured to sequentially receive a transmission signal for each of a plurality of blocks from a transmitting side via a specific transmission line, wherein
  each of the plurality of blocks includes a plurality of frames for an audio signal, and
  the transmission signal includes:
    a tactile vibration signal of a specific number of channels, and
    configuration information of the tactile vibration signal of the specific number of channels; and
a processing unit configured to:
  process the transmission signal based on the configuration information, and
  output the tactile vibration signal of the specific number of channels based on the processed transmission signal.
10. The reception device according to claim 9, wherein the configuration information is added based on a specific bit area of a channel status configured for each block.
11. The reception device according to claim 9, wherein the specific transmission line includes at least one of a coaxial cable, an optical cable, an Ethernet (IEC 61883-6) cable, an HDMI cable, an MHL cable, or a display port cable.
12. A reception method, comprising
sequentially receiving, by a reception unit, a transmission signal for each of a plurality of blocks from a transmitting side via a specific transmission line, wherein
  each of the plurality of blocks includes a plurality of frames for an audio signal, and
  the transmission signal includes:
    a tactile vibration signal of a specific number of channels, and
    configuration information of the tactile vibration signal of the specific number of channels;
processing, by a processing unit, the transmission signal based on the configuration information; and
outputting, by the processing unit, the tactile vibration signal of the specific number of channels based on the processed transmission signal.
13. A transmission device, comprising:
a transmission unit configured to sequentially transmit a transmission signal for each of a plurality of blocks to a receiving side via a specific transmission line, wherein
  each of the plurality of blocks includes a plurality of frames for an audio signal,
  the transmission signal selectively includes one of a first mode signal or a second mode signal,
  the first mode signal includes an audio signal of a specific number of channels and a tactile vibration signal of the specific number of channels, and
  the second mode signal includes only the tactile vibration signal of the specific number of channels; and
an information addition unit configured to add configuration information of the tactile vibration signal to the transmission signal.
14. A reception device, comprising:
a reception unit configured to sequentially receive a transmission signal for each of a plurality of blocks from a transmitting side via a specific transmission line, wherein
  each of the plurality of blocks includes a plurality of frames for an audio signal, and
  the transmission signal includes:
    one of a first mode signal or a second mode signal, wherein
      the first mode signal includes an audio signal of a specific number of channels a tactile vibration signal of the specified number of channels, and
      the second mode signal includes only the tactile vibration signal of the specified number of channels, and
    configuration information of the tactile vibration signal of the specific number of channels; and
a processing unit configured to:
  process the transmission signal based on the configuration information, and output the tactile vibration signal of the specific number of channels based on the processed transmission signal.

\* \* \* \* \*